United States Patent [19]
Smith et al.

[11] Patent Number: 5,898,523
[45] Date of Patent: Apr. 27, 1999

[54] TILED RETROREFLECTIVE SHEETING COMPOSED OF HIGHLY CANTED CUBE CORNER ELEMENTS

[75] Inventors: Kenneth L. Smith, White Bear Lake; Gerald M. Benson, Woodbury, both of Minn.

[73] Assignee: Minnesota Mining & Manufacturing Company, St. Paul, Minn.

[21] Appl. No.: 08/887,389

[22] Filed: Jul. 2, 1997

[51] Int. Cl.⁶ .................................................. G02B 5/124

[52] U.S. Cl. .......................... 359/530; 359/529; 264/1.1; 425/808

[58] Field of Search .................................. 359/529, 530, 359/900; 425/808; 264/1.1, 1.9

[56] References Cited

U.S. PATENT DOCUMENTS

| | | | |
|---|---|---|---|
| Re. 29,396 | 9/1977 | Heenan | 204/281 |
| 835,648 | 11/1906 | Straubel . | |
| 1,591,572 | 7/1926 | Stimson . | |
| 2,380,447 | 7/1945 | Jungerson . | |
| 3,190,178 | 6/1965 | McKenzie . | |
| 3,417,959 | 12/1968 | Schultz | 249/117 |
| 3,684,348 | 8/1972 | Rowland . | |
| 3,712,706 | 1/1973 | Stamm . | |

(List continued on next page.)

FOREIGN PATENT DOCUMENTS

| | | |
|---|---|---|
| 1289029 | 2/1962 | France . |
| 1917292 | 10/1970 | Germany . |
| 92 17 179 | 6/1993 | Germany . |
| 42 36 799 A1 | 5/1994 | Germany . |
| 42 40 680 A1 | 6/1994 | Germany . |
| 44 10 994 C2 | 1/1996 | Germany . |
| 44 29 683 C1 | 3/1996 | Germany . |

(List continued on next page.)

OTHER PUBLICATIONS

American Society for Testing and Materials, ASTM Designation E808–93b, "Standard Practice for Describing Retroreflection," *1994 Annual Book of ASTM Standards*, vol. 6.01, p. 792.

American Society for Testing and Materials, ASTM Designation E809–94a, "Standard Practice for Measuring Photometric Characteristics of Retroreflectors," *1998 Annual Book of ASTM Standards*, vol. 6.01, p. 743 (Stated to be published Jun. 1994).

(List continued on next page.)

*Primary Examiner*—James Phan
*Attorney, Agent, or Firm*—Stephen C. Jensen

[57] ABSTRACT

A retroreflective sheeting includes a first array of cube corner element opposing pairs and a second array of cube corner element opposing pairs. The symmetry axes of the cube corner elements in the first and second arrays are tilted in a backward direction at an angle of about 12° to about 30° from an axis normal to a base surface. The second array of cube corner elements is oriented approximately perpendicular to the first array to yield a retroreflective article providing generally uniform total light return about a 360° range of orientation angles and/or a minimum total light return of about 5% across such 360° range. Also disclosed is a mold assembly suitable for use in forming the present retroreflective sheeting and a method of making a retroreflective article using the mold.

32 Claims, 11 Drawing Sheets

U.S. PATENT DOCUMENTS

| | | |
|---|---|---|
| 3,873,184 | 3/1975 | Heenan . |
| 3,922,065 | 11/1975 | Schultz . |
| 3,924,928 | 12/1975 | Trimble . |
| 3,926,402 | 12/1975 | Heenan ................................. 249/117 |
| 4,025,159 | 5/1977 | McGrath . |
| 4,066,236 | 1/1978 | Lindner ................................. 249/160 |
| 4,066,331 | 1/1978 | Lindner . |
| 4,095,773 | 6/1978 | Lindner ................................. 249/117 |
| 4,202,600 | 5/1980 | Burke . |
| 4,243,618 | 1/1981 | Van Arnam ............................... 264/1 |
| 4,588,258 | 5/1986 | Hoopman . |
| 4,601,861 | 7/1986 | Pricone et al. ......................... 264/1.6 |
| 4,775,219 | 10/1988 | Appeldorn et al. . |
| 5,066,098 | 11/1991 | Kult et al. ............................. 359/540 |
| 5,138,488 | 8/1992 | Szczech ................................. 359/529 |
| 5,171,624 | 12/1992 | Walter .................................. 428/156 |
| 5,182,663 | 1/1993 | Jones ..................................... 359/70 |
| 5,300,263 | 4/1994 | Hoopman et al. ...................... 264/2.5 |
| 5,450,235 | 9/1995 | Smith et al. ......................... 359/529 |
| 5,557,836 | 9/1996 | Smith et al. ......................... 29/527.4 |
| 5,564,870 | 10/1996 | Benson et al. ....................... 409/131 |
| 5,565,151 | 10/1996 | Nilsen .................................. 264/1.1 |
| 5,585,164 | 12/1996 | Smith et al. ......................... 428/156 |
| 5,600,484 | 2/1997 | Benson et al. ....................... 359/418 |
| 5,706,132 | 1/1998 | Nestegard et al. ................... 359/529 |

FOREIGN PATENT DOCUMENTS

| | | |
|---|---|---|
| 297 01 903 | 5/1997 | Germany . |
| 8-309851 | 11/1996 | Japan . |
| 441319 | 1/1936 | United Kingdom . |
| 463304 | 3/1937 | United Kingdom . |
| WO 94/18581 | 8/1994 | WIPO . |
| WO 95/11464 | 4/1995 | WIPO . |
| WO 96/10197 | 4/1996 | WIPO . |
| WO 96/30786 | 10/1996 | WIPO . |
| WO 96/42024 | 12/1996 | WIPO . |
| WO 96/42025 | 12/1996 | WIPO . |
| WO 97/04939 | 2/1997 | WIPO . |
| WO 97/04940 | 2/1997 | WIPO . |
| WO 97/27035 | 7/1997 | WIPO . |
| WO 97/45255 | 12/1997 | WIPO . |

OTHER PUBLICATIONS

Cooke, "Optical Activities In Industry," *Applied Optics*, vol. 20, No. 8, Apr. 15, 1981.

Eckhardt, H.D., "Simple Model of Corner Reflector Phenomena," *Applied Optics*, Jul., 1971, vol. 10, No. 7.

Rityan, "Optics of Cube Corner Reflectors" *Soviet Journal of Optics Technology*, vol. 34, p. 195 (1967).

TILED RETROREFLECTIVE SHEETING COMPOSED OF HIGHLY CANTED CUBE CORNER ELEMENTS

FIELD OF THE INVENTION

The present invention relates generally to cube corner retroreflective sheeting that is capable of returning a significant percentage of incident light at relatively high entrance angles regardless of the rotational orientation of the sheeting about an axis perpendicular to its major surface.

BACKGROUND OF THE INVENTION

Retroreflective materials are characterized by redirecting incident light back toward the originating light source. This property has led to the wide-spread use of retroreflective sheeting in a variety of conspicuity applications. Retroreflective sheeting is commonly applied to flat, rigid articles such as, for example, road signs and barricades to improve their conspicuity in poor lighting conditions. Retroreflective sheeting is also used on irregular or flexible surfaces. For example, retroreflective sheeting can be adhered to the side of a truck trailer, which requires the sheeting to cover corrugations and protruding rivets, or the sheeting can be adhered to a flexible body portion such as a road worker's safety vest or other such safety garment.

Many conspicuity applications are governed by specific performance standards for retroreflective sheeting. Manufacturers must demonstrate that their retroreflective sheeting is capable of meeting the relevant performance standards to be considered as a supplier in the marketplace. A body of standards exists both for describing retroreflection (see ASTM Designation E808-93b, Standard Practice for Describing Retroreflection) and for measuring retroreflectors, (see ASTM Designation E809-94a, Standard Practice for Measuring Photometric Characteristics of Retroreflectors).

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Illustrative examples are disclosed in U.S. Pat. Nos. 3,190,178 (McKenzie), 4,025,159 (McGrath), and 5,066,098 (Kult). Due to the symmetry of beaded retroreflectors, microsphere-based sheeting exhibits relatively uniform entrance angularity when rotated about an axis normal to the surface of the sheeting. Therefore, the retroreflective performance of beaded sheeting is relatively insensitive to the orientation at which the sheeting is placed on the surface of an object. In general, however, microsphere-based sheeting exhibits relatively low retroreflective efficiency. Beaded retroreflective sheeting typically exhibits a total light return of approximately 5% to 15% in an observation cone angled about 2°.

Cube corner retroreflective sheeting comprises a body portion typically having a substantially planar base surface and a structured surface comprising a plurality of cube corner elements opposite the base surface. Each cube corner element comprises three mutually substantially perpendicular optical faces that typically intersect at a single reference point, or apex. The base of the cube corner element acts as an aperture through which light is transmitted into the cube corner element. In use, light incident on the base surface of the sheeting is refracted at the base surface of the sheeting, transmitted through the respective bases of the cube corner elements disposed on the sheeting, reflected from each of the three perpendicular cube corner optical faces, and redirected toward the light source.

One aspect of many performance standards requires retroreflective sheeting to return specified percentages of light incident on the face of the sheeting at various entrance angles. The total light return characteristic of a retroreflective sheeting as a function of the entrance angle of incident light is generally referred to in the art as the 'entrance angularity' of the sheeting. A retroreflective sheeting capable of returning a significant percentage of light incident at relatively high entrance angles can be characterized as having strong or wide entrance angularity, such as disclosed in the isobrightness curves in U.S. Pat. No. 4,588,258 (Hoopman).

By contrast, retroreflective sheeting with poor entrance angularity loses its retroreflective brightness (total light return decreases) rapidly as the angle of incidence deviates from 0°. Moreover, entrance angularity typically varies about a 360° range of orientation angles (orientational uniformity), requiring proper alignment of the retroreflective sheeting for each application. The entrance angularity and orientational uniformity of a retroreflective sheeting is a significant performance factor because it materially affects the ability of a driver to see an object such as a traffic sign or a safety barrier in poor lighting conditions at various orientations.

The symmetry axis, also called the optical axis, of a cube corner element is the axis that forms an equal angle with the three optical surfaces of the cube corner element. Cube corner elements typically exhibit the highest optical efficiency in response to light incident on the base of the element roughly along the optical axis. The amount of light retroreflected by a cube corner retroreflector drops as the incidence angle deviates from the optical axis.

Cube corner elements offer the advantage of being significantly more efficient retroreflectors than beads. The terms 'active area' and 'effective aperture' are used in the cube corner arts to characterize the portion of a cube corner element that retroreflects light incident on the base of the element. A detailed teaching regarding the determination of the active aperture for a cube corner element design is beyond the scope of the present disclosure. One procedure for determining the effective aperture of a cube corner geometry is presented in Eckhardt, Applied Optics, v. 10, n. 7, July, 1971, pp. 1559–1566. U.S. Pat. No. 835,648 (Straubel) also discusses the concept of effective aperture. At a given incidence angle, the active area can be determined by the topological intersection of the projection of the three cube corner faces onto a plane normal to the refracted incident light with the projection of the image surfaces for the third reflections onto the same plane. The term 'percent active area' is then defined as the active area divided by the total area of the projection of the cube corner faces. The retroreflective efficiency of retroreflective sheeting is directly proportional to this percent active area. The maximum theoretical total light return of truncated cube corner elements commonly used in retroreflective sheeting is approximately 67%, while in practice cube corner retroreflective sheeting exhibits a maximum total light return of approximately 35%, due to sealing, front surface losses, and reflection losses at the cube faces.

Predicted total light return (TLR) for a cube corner matched pair array can be calculated from a knowledge of percent active area and ray intensity. Ray intensity can be reduced by front surface losses and by reflection from each of the three cube corner surfaces for a retroreflected ray. Total light return is defined as the product of percent active area and ray intensity, or a percentage of the total incident light which is retroreflected. A discussion of total light return for directly machined cube corner arrays is presented in U.S. Pat. No. 3,712,706 (Stamm).

The light return profile of the basic cube corner element is inherently asymmetric in nature. The breakdown of total internal reflection (TIR) is the most significant cause of this asymmetry in non-metallized cube corner retroreflectors. Coating the reflecting faces with a specular reflector substantially reduces the asymmetry in the reflection pattern. Metallized cube corner arrays, however, are typically not white enough for daytime viewing, such as on signing applications. The durability of the specular vapor coat may also be inadequate. Finally, a portion of the asymmetry is due in part to the asymmetric physical geometry of a cube corner element. See Rityan, Optics of Corner Cube Reflectors, Soviet Journal of Optics Technology, v. 34, p. 195 (1967).

Retroreflective sheeting formed from cube corner elements exhibits a corresponding asymmetry in its light return profile. By way of example, U.S. Pat. No. 3,712,706 to Stamm ('706 patent) discloses the three-lobed light return profile characteristic of a single cube corner element. Similarly, U.S. Pats. No. 4,202,600 (Burke) and 4,243,618 (Van Arnam) disclose an array of cube corner elements having a plurality of zones with different angular orientations, such that the total light return retroreflected by cube corner retroreflective sheeting varies as a function of the entrance angle of the incident light and the orientation angle of the sheeting on the substrate. The six-lobed light return profile of Burke and Van Arnam is characteristic of a matched pair of cube corner elements.

One approach to reducing the asymmetry of retroreflective sheeting is by providing a retroreflective sheeting construction with a plurality of discrete cube corner arrays disposed at different orientations; a technique referred to in the art as 'tiling'. Burke and Van Arnam patents disclose retroreflective sheeting having arrays of conventional truncated cube corner elements with equilateral base triangles tiled in a variety of different orientations on the surface of the sheeting. While the constructions suggested in these references address the issue of asymmetry, the cube corner geometries disclosed in these references suffer a rapid decline in total light return at entrance angles greater than about 40°, since only a small portion of the cubes are optically functional at a particular orientation. Therefore, retroreflective sheeting in accordance with these references do not provide adequate total light return at high entrance angles for many applications.

Another approach to accommodating this variation in entrance angularity is to design retroreflective sheeting to have specific planes of improved entrance angularity. By way of example, the Hoopman patent discloses a retroreflective sheeting wherein the cube corner elements are arranged in opposing matched pairs having their respective symmetry axes tilted toward one another. This geometry results in a retroreflective sheeting with improved entrance angularity in a plane substantially coincident with the plane that contains the symmetry axes of the cube corner elements, identified as the X-axis plane, and also in a Y-axis plane perpendicular to the X-axis plane. In use, the sheeting is preferentially oriented on the substrate such that these planes coincide with the planes in which light will become incident on the sheeting. By way of example, a preferred orientation for the sheeting on a road sign is to align the X-axis plane substantially parallel with the ground.

U.S. Pat. No. 5,565,151 (Nilsen) discloses matched pairs of retroreflective cube corner elements that are tilted or canted between more than 1.0 degree and less than about 7.0 degrees in a negative direction. A section of one of the cube corner elements in the matched pair is removed, creating a smaller element which produces increased observation angle performance.

U.S. patent application Ser. No. 08/5887,719 (Nestegard et al.), entitled Dual Orientation Retroreflective Sheeting, discloses a retroreflective sheeting with alternating zones of cube corner arrays oriented such that their primary planes of entrance angularity are approximately perpendicular to one another.

Thus, there is a need in the art for a retroreflective sheeting that maintains a visibly useful total light return across a 360° range of orientation angles, particularly at entrance angles greater than about 40°. Additionally, there is a need in the art for a retroreflective sheeting having relatively small variations in total light return across a 360° range of orientation angles at higher entrance angles and particularly at entrance angles greater than about 40°.

BRIEF SUMMARY OF THE INVENTION

Preferred cube corner retroreflective sheeting disclosed herein includes highly canted cube corner elements tiled in two approximately perpendicular orientations such that the sheeting maintains a visibly useful total light return at all orientation angles for entrance angles about 40°, and more preferably about 50° and most preferably about 60°. Thus, a cube corner retroreflective sheeting is disclosed that is relatively less sensitive to orientation when compared with existing cube corner retroreflective sheeting constructions. The preferred retroreflective sheeting maintains visibly useful total light return performance at high entrance angles while maintaining high total light return at lower entrance angles.

The retroreflective article comprises a substrate having a base surface and a structured surface having a plurality of arrays of cube corner elements opposite the base surface. The arrays of cube corner elements comprise a first array of cube corner element opposing pairs and a second array of cube corner element opposing pairs. The symmetry axes of the cube corner elements in the first array are tilted in a backward direction at an angle measuring between about 12° and about 30° from an axis normal to the base surface. The symmetry axes of the cube corner elements in the second array are likewise tilted in a backward direction by an angle measuring between about 12° and about 30° from an axis normal to the base surface. The second array of cube corner elements are oriented approximately perpendicular to the first array so that the retroreflective article provides a minimum total light return of about 5% across about a 360° range of orientation angles at an entrance angle of about 40°.

In an alternate embodiment, the symmetry axes of the cube corner elements in the first array are tilted in a backward direction at an angle measuring between about 12° and about 30° from an axis normal to the base surface. The symmetry axes of the cube corner elements in the second array are likewise tilted in a backward direction by an angle measuring between about 12° and about 30° from an axis normal to the base surface. The second array of cube corner elements are oriented approximately perpendicular to the first array so that the retroreflective article provides generally uniform total light return about a 360° range of orientation angles. In another embodiment, the cube corner elements in the first and second arrays are tilted in a backward direction at an angle measuring between about 15.1° and about 30°.

The first array and the second array occupy roughly equal portions of the structured surface of the retroreflective article. The cube corner elements are generally trihedral structures comprising three mutually perpendicular triangular optical faces that intersect at a peak and a triangular base. The triangular base for truncated cube corner elements is approximately coplanar with the base surface of the article. Alternatively, the cube corner elements can be "full cubes," e.g. generally polygonal structures comprising three mutually perpendicular optical faces including two tetragonal optical faces and a third optical face that intersect at a peak, and a tetragonal base.

The symmetry axes of the cube corner elements in the arrays are more preferably tilted in a backward direction at an angle measuring between about 14° and about 20° from an axis normal to the base surface. The symmetry axes of the cube corner elements in the first and second arrays can be tilted the same or a different amount. The second array is preferably oriented at an angle between about 85° and about 95° relative to the first array, and most preferably at about 90°.

The retroreflective article exhibits a maximum theoretical total light return of approximately 100% percent in response to light incident on the article along an axis normal to the base surface of the article. The retroreflective article is preferably capable of a minimum total light return of about 5%, and more preferably 10%, across about a 360° range of orientation angles at an entrance angle of about 40°, and more preferably at an entrance angle of about 50° and most preferably at an entrance angle of about 60°.

The cube corner element opposing pairs may or may not be physically adjacent to each other, and can have the same or different retroreflection pattern. In one embodiment, the cube corner element opposing pairs are matched pairs that generate mirror image retroreflection patterns, such as elements that are substantially identical but are rotated 180° relative to each other. Retroreflection patterns and reflection patterns refer to the configuration of reflected light, typically illustrated as isobrightness contours.

The substrate and the cube corner elements are preferably formed as a unitary article from a light transmissible material having a refractive index of between 1.3 and 1.7. In one embodiment, the body layer of the retroreflective article comprises a light transmissible polymeric material having an elastic modulus less than about $7 \times 10^8$ pascals, and the cube corner elements are formed from a light transmissible material having an elastic modulus greater than about $16 \times 10^8$ pascals. The cube corner elements can incorporate minor deviations from perfect orthogonality to thereby alter the light distribution in the emerging cone of retroreflected light.

The first and second arrays of cube corner elements can be coated with a specularly reflective substance. A sealing medium can be disposed adjacent to the first and second arrays of cube corner elements. The sealing medium is preferably bonded to the structured surface by a network of intersecting bonds that define a plurality of cells within which the cube corner elements are hermetically sealed. The sealing medium maintains an air interface with the structured surface such that the cube corner elements retroreflect according to the principles of total internal reflection.

A preferred mold assembly suitable for use in forming the retroreflective sheeting and a method of making a retroreflective article using the mold are also disclosed. The mold assembly includes a substrate having a base surface and a mold surface opposite the base surface. The mold surface includes in roughly equal proportions a first and a second array of cube corner element opposing pairs. The symmetry axes of the cube corner elements in the array are preferably tilted in a backward direction at an angle of between 15.1° and 30° from an axis normal to the base surface. The second array of cube corner elements is oriented approximately perpendicular to the first array. In an alternate embodiment, the first and second arrays of cube corner element opposing pairs are tilted by an angle of between about 15.1° and about 20°. The method of making a retroreflective article includes forming a replica of the mold. The replica of the mold includes a mold surface having a negative image of the mold. A retroreflective article is formed in the mold surface of the replica.

DETAILED DESCRIPTION OF THE PREFERRED EMBODIMENTS

Figure 1A:
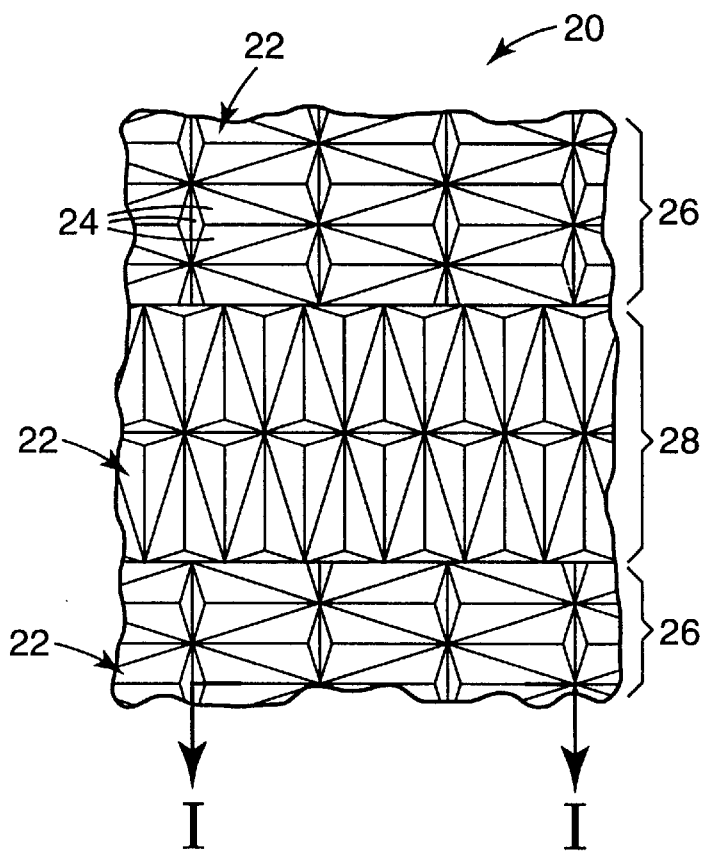
FIG. 1A is a plan view of a portion of a retroreflective sheeting in accordance with a preferred embodiment of the invention.

Preferred cube corner retroreflective sheeting disclosed herein is capable of returning a significant percentage of incident light at relatively high entrance angles at all rotational orientations of the sheeting about an axis perpendicular to its major surface. The retroreflective sheeting comprises a first array of cube corner element matched pairs and a second array of cube corner element matched pairs. The symmetry axes of the cube corner elements in the arrays are tilted in a backward direction at an angle measuring between about 12° and about 30° from an axis normal to the base surface. The first array of cube corner elements is oriented approximately perpendicular to the second array.

Also disclosed is a retroreflective article, preferably a retroreflective sheeting that maintains a visibly useful total light return at all orientation angles for entrance angles up to 40°, and more preferably up to 50° or 60°. The structured surface of the sheeting requires as few as two zones of cube corner element arrays preferably tiled along two orthogonal axes to accomplish this optical objective, thereby substantially reducing the effort and expense required to scale-up production for such a sheeting. Each zone includes an array of optically opposing cube corner retroreflective elements in which the optical axes are canted or tilted in a backward, or negative, direction by an angle between about 12° and about 30°, from an axis normal to the base surface of the sheeting, and more preferably between about 14° and about 20°.

In describing preferred embodiments of the invention, specific terminology will be used for the sake of clarity. However, the invention is not to be limited to the specific terms so selected. It is to be understood that each term so selected includes all technical equivalents that operate similarly. Additionally, while the present application discloses several embodiments of cube corner element geometries, a wide variety of cube corner geometries, such as full cubes and truncated cubes, can also be used. The base edges of adjacent truncated cube corner elements in an array are typically coplanar. The base edges of adjacent full cube corner elements in an array are not all in the same plane. One of ordinary skill in the optical arts will understand that varying degrees of canting and varying cube sizes can be used within the scope of the present disclosure. Insubstantial changes in cube geometries calculated to yield substantially the same optical results should also be considered within the scope of the present application.

Retroreflective element opposing pairs refers generally to two cube corner elements that generate opposing, although not necessarily identical, retroreflection patterns. The cube corner elements are not necessarily physically adjacent to each other. It is possible for opposing pairs to be physically separated on the retroreflective article. Matched pairs generally refers to opposing pairs of cube corner elements that generate mirror image retroreflection patterns, such as elements that are substantially identical but are rotated 180° relative to each other. Matched pairs are typically physically adjacent to each other.

Tiling the structured surface of the sheeting such that the cube corner arrays in the first zone are oriented about 75° to about 105°, and more preferably about 85° to about 95°, and more preferably about 90° to the cube corner arrays in the second plane provides a sheeting that maintains a visible total light return (TLR) at all orientation angles for entrance angles of up to 70°. Generally uniform total light return about a 360° range of orientation angles refers to a minimum total light return of about 5%, and more preferably a minimum of about 10%, at an entrance angle of about 40°, and more preferably up to about 50° and most preferably about 60°. Additionally, when the structured surface is composed of cube corner elements whose optical axes are canted within preferred angular ranges, the sheeting exhibits relatively small variations in theoretical total light return across a 360° range of orientation angles, even at relatively high entrance angles. Thus, the sheeting is less sensitive to orientation than existing retroreflective sheeting, while maintaining high levels of TLR at high entrance angles. A variety of methods are available for arranging the cube corner elements into two generally orthogonal zones.

Related U.S. Patent Applications filed on the same date herewith include: U.S. Ser. No. 08/886,074, Cube Corner Sheeting Mold and Method Making the Same; U.S. Ser. No. 08/886,998, Retroreflective Cube Corner Sheeting Mold and Sheeting Formed Therefrom; 08/887,390, Retroreflective Cube Corner Sheeting, Molds Therefore, and Methods of Making the Same; 08/887,074, Retroreflective Cube Corner Sheeting Mold and Method for Making the Same; and U.S. Ser. No. 08/887,006, Dual Orientation Retroreflective Sheeting.

FIG. 1A depicts a magnified view of a portion of the structured surface of a preferred retroreflective sheeting 20. The structured surface includes a plurality of alternating zones 26, 28 which comprise two generally orthogonal arrays of highly canted cube corner elements 22. The cube corner elements 22 depicted in FIG. 1A are commonly referred to in the art as truncated cube corner elements, although full cube corner elements can also be used as will be discussed below. As shown, the cube corner elements 22 are disposed as optically opposing matched pairs in the zones 26, 28 on one side of the sheeting. Each cube corner element 22 has the shape of a trihedral prism with three exposed planar faces 24. The dihedral angle between the cube corner element faces 24 typically is the same for each cube corner element in the array and measures about 90°. The angle, however, can deviate slightly from 90° as is taught in U.S. Pat. No. 4,775,219 to Appledom et al.

The structured surface of sheeting 20 comprises a plurality of alternating zones 26, 28 of cube corner arrays disposed at approximately ninety degree orientations. The sheeting 20 preferably includes, in a repeating pattern, a first zone 26 including an array of cube corner elements 22 disposed in a first orientation and a second zone 28 of cube corner elements disposed in a second orientation. A suitable method for strip-tiling retroreflective sheeting is disclosed in U.S. Pat. Ser. No. 08/587,719 (Nestegard et al.) entitled Dual Orientation Retroreflective Sheeting. Alternatively, the sheeting 20 can be formed by a wide variety of tiling schemes that provide the first zone 26 generally perpendicular to the second zones 28. The tiling schemes preferably minimizes the number of deformed or otherwise optically inoperative cube corner elements. Although the first zone 26 includes an array of cube corner elements 22 formed by three mutually intersecting sets of grooves, cube corner elements can be formed with two groove sets, such as disclosed in U.S. Ser. No. 08/887,074, Retroreflective Cube Corner Sheeting Mold and Method for Making the Same.

The individual cube corner elements 22 in the array define base triangle included angles of 72.60°, 72.60°, and 34.80°. Further, the cube corner elements have a height of about 10 microns to about 1000 microns. Second zone 28 extends substantially parallel to first zone 26 along the length of sheeting and includes an array of cube corner elements 22 substantially identical to the array disposed in first zone 26, however the array in the second zone is disposed at about a ninety degree orientation relative to the array in first zone 26.

Figure 1B:
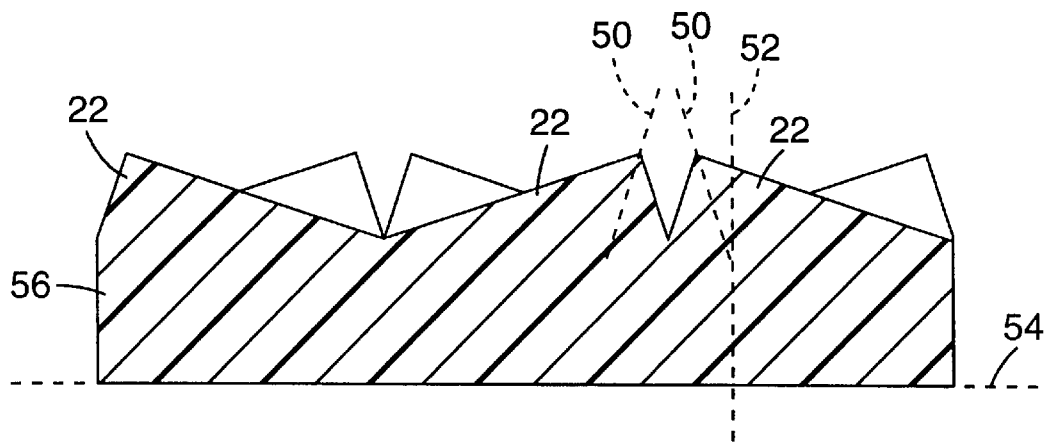
FIG. 1B is a side view of a portion of the structured surface of the sheeting of FIG. 1, taken along lines I—I.

As best seen in FIG. 1B, the symmetry axes 50 of opposing cube corner elements 22 are canted or tilted in a backward, or negative, direction by an angle that measures between about 12° and about 30°, from an axis 52 normal to the base surface 54 of the sheeting, and more preferably between about 14° and about 20°. This degree of canting provides a cube corner element with one primary plane of entrance angularity. The axes are canted in a direction commonly referred to in the art as a 'backward' or 'negative' direction as discussed in U.S. Pat. No. 5,565,151(Nilsen). This is to be distinguished from canting in a 'forward', or 'positive' direction as disclosed in U.S. Pat. No. 4,588,258 (Hoopman).

Backward canted cube corner elements can also be characterized in that only one included angle of the cube corner element base triangle is less than 60°. The other two included angles measure at least 60°. By contrast, forward canted cubes can be characterized in that two of the included angles of the base triangle are less than 60° and a single base triangle included angle measures greater than 60°. It will be understood that the particular geometry discussed herein relate to preferred embodiments. One of ordinary skill will understand that varying degrees of canting and varying cube sizes can also be used.

The sheeting 20 can include a separate body layer 56 that includes a light transmissible polymeric material formed from a light transmissible material having an elastic modulus less than about $7 \times 10^8$ pascals. The cube corner elements 22 can then be formed from a different light transmissible material having an elastic modulus greater than about $16 \times 10^8$ pascals. The cube corner elements 22 preferably are constructed from a thermoplastic or thermoset polymer. The polymeric body layer 56 is preferably constructed from a thermoformable polymer. The body layer can be selected from the group consisting of ionomeric ethylene copolymers, plasticized vinyl halide polymers, acid-functional ethylene copolymers, aliphatic polyurethanes, aromatic polyurethanes, other light transmissive elastomers, and combinations thereof. The cube corner elements 22 can be selected from the group consisting of monofunctional, difunctional, and polyfunctional acrylates or combinations thereof. A specular reflector can be applied to the entire surface of the retroreflective sheeting 20 or along selected zones thereof.

Figure 2:
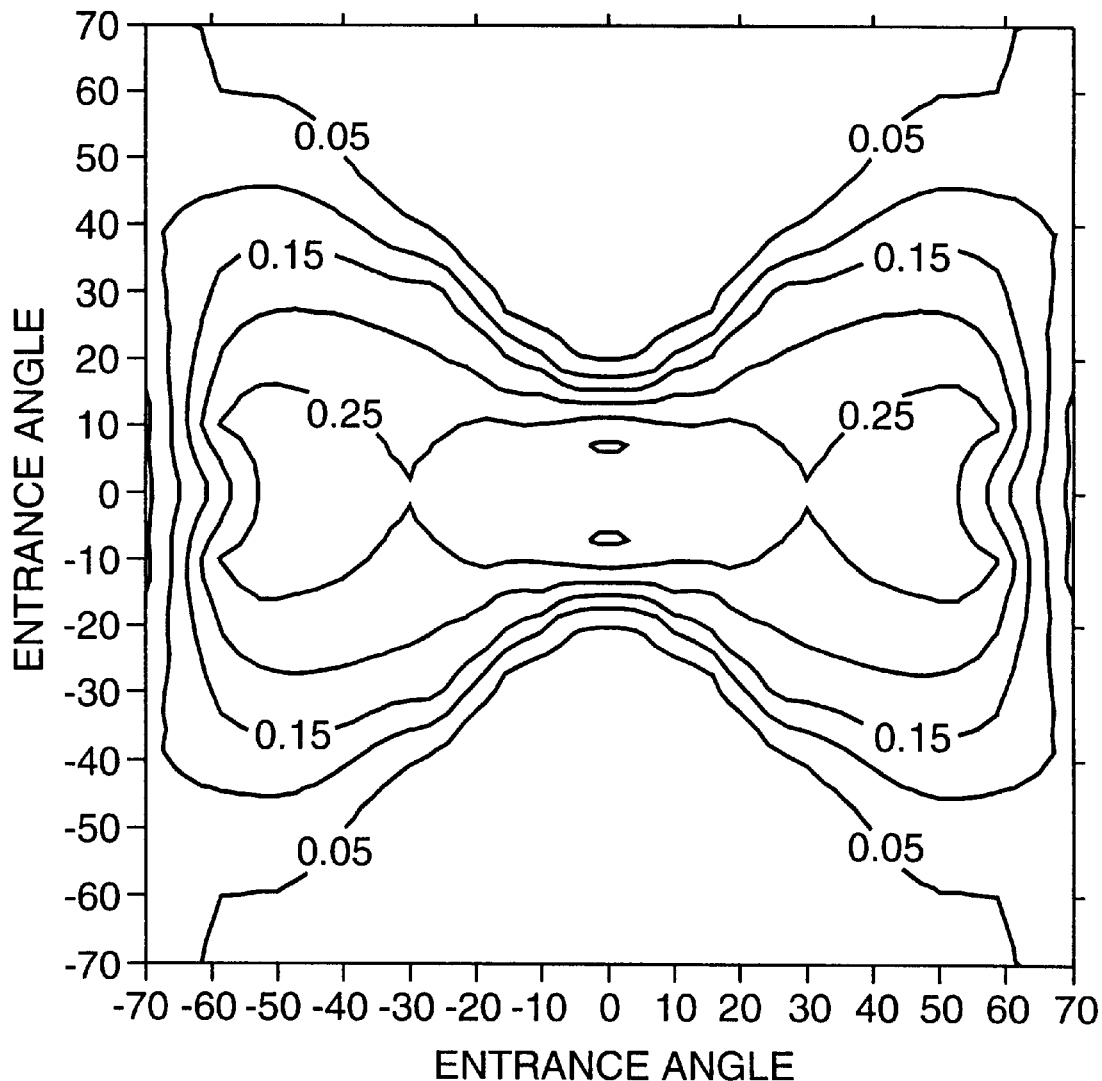
FIG. 2 is a polar plot of the isobrightness contours of retroreflected light for a single array of the cube corner sheeting of FIG. 1 prior to tiling.

FIG. 2 is an isobrightness contour depicting the total light return profile of an array of truncated cube corner elements as illustrated in zone 26 of the retroreflective sheeting of FIG. 1A. The truncated cube corner elements were canted 17° in a backward direction formed from a material having in index of refraction of 1.59. The highly canted cube corner elements 22 of the first zone 26 provide one primary plane of entrance angularity.

As used herein, isobrightness contours plot the total light return obtained from cube corner elements. The concentric isobrightness curves represent the predicted total light return as a percentage of the light incident on the base surfaces of the cube corner elements at various combinations of entrance angles and orientation angles. Radial movement from the center of the plot represents increasing entrance angles, while circumferential movement represents changing the orientation of the cube corner element with respect to the light source. The maximum retroreflectance is represented by the center point on the graph and concentric isobrightness contours representing five percent reductions in retroreflectance relative to the maximum, measured in total light return, are plotted.

Figure 3:
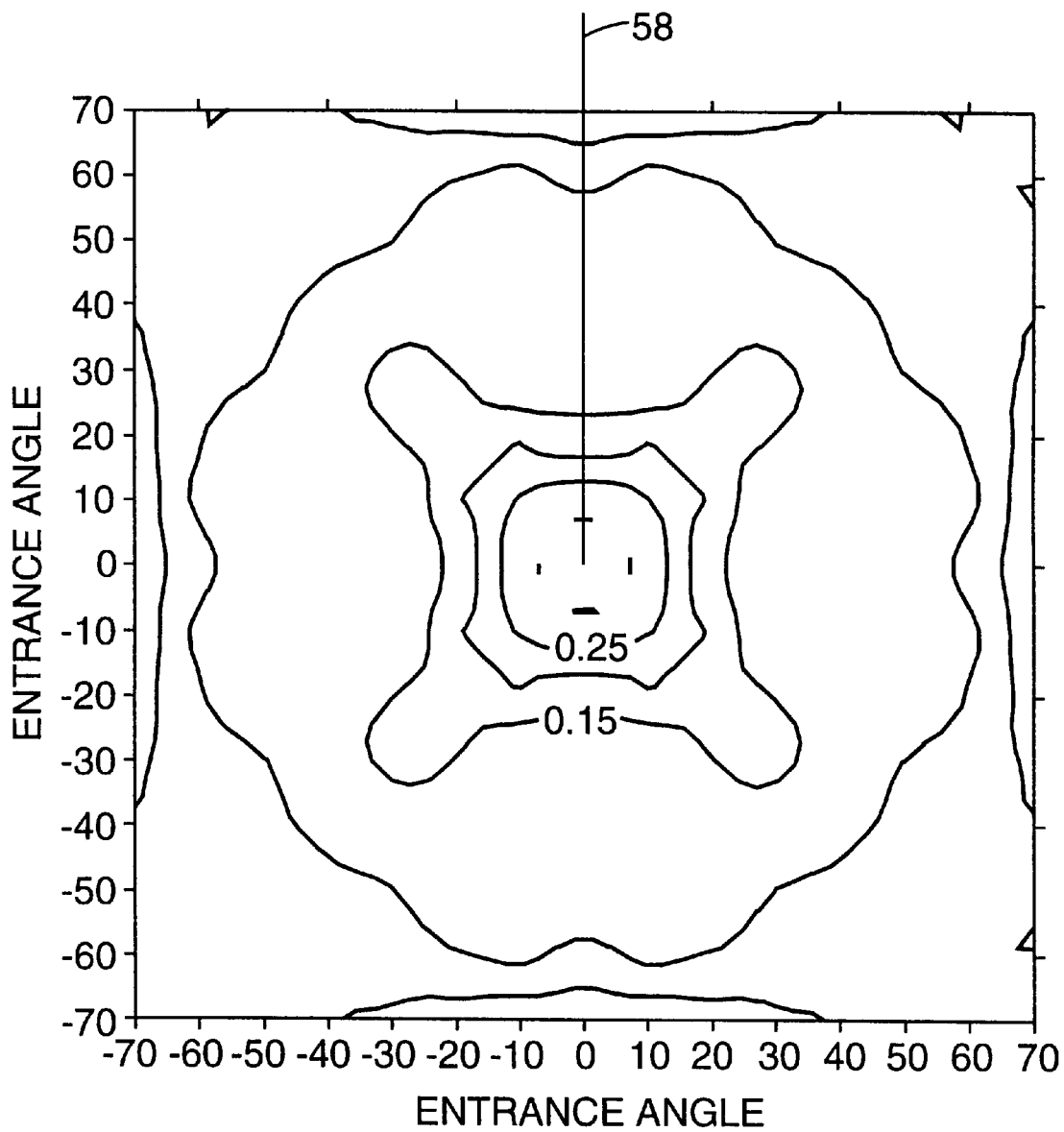
FIG. 3 is a polar plot of the isobrightness contours of retroreflected light for the cube corner sheeting of FIG. 1.

FIG. 3 is an isobrightness contour depicting the total light return profile of retroreflective sheeting 20 having a structured surface comprising truncated cube corner elements 22 canted 17° in a backward direction, tiled in accordance with the embodiment depicted in FIG. 1, and formed from a material having an index of refraction of 1.59.

Table 1 contains the data presented graphically in FIG. 3 for such retroreflective sheeting. The rotational orientation data of Table 1 is limited to 0 to 90°, rather than a fill 360°, since the pattern repeats every 90°. The total light return data for Table 1 does not include losses due to sealing, reflective coatings, etc. Zero degree orientation in Table 1 corresponds to the positive y-axis 58.

TABLE 1

| entrance angle | rotational orientation angle | | | | | | | | | | min | max | range |
|---|---|---|---|---|---|---|---|---|---|---|---|---|---|
| | 0 | 10 | 20 | 30 | 40 | 50 | 60 | 70 | 80 | 90 | | | |
| 0 | 0.304 | 0.304 | 0.304 | 0.304 | 0.304 | 0.304 | 0.304 | 0.304 | 0.304 | 0.304 | 0.304 | 0.304 | 0.000 |
| 10 | 0.291 | 0.288 | 0.288 | 0.288 | 0.289 | 0.289 | 0.288 | 0.288 | 0.288 | 0.287 | 0.287 | 0.289 | 0.002 |
| 20 | 0.162 | 0.163 | 0.179 | 0.222 | 0.203 | 0.203 | 0.222 | 0.179 | 0.163 | 0.162 | 0.162 | 0.222 | 0.060 |
| 30 | 0.133 | 0.133 | 0.132 | 0.132 | 0.187 | 0.187 | 0.132 | 0.131 | 0.133 | 0.133 | 0.131 | 0.187 | 0.056 |
| 40 | 0.139 | 0.136 | 0.129 | 0.120 | 0.175 | 0.175 | 0.120 | 0.129 | 0.136 | 0.139 | 0.120 | 0.175 | 0.055 |
| 50 | 0.140 | 0.137 | 0.126 | 0.111 | 0.122 | 0.122 | 0.111 | 0.126 | 0.137 | 0.140 | 0.111 | 0.140 | 0.030 |
| 60 | 0.077 | 0.129 | 0.115 | 0.096 | 0.100 | 0.101 | 0.096 | 0.115 | 0.129 | 0.077 | 0.077 | 0.129 | 0.053 |
| 70 | 0.019 | 0.022 | 0.053 | 0.072 | 0.081 | 0.080 | 0.072 | 0.052 | 0.022 | 0.019 | 0.019 | 0.081 | 0.062 |

Figure 4:
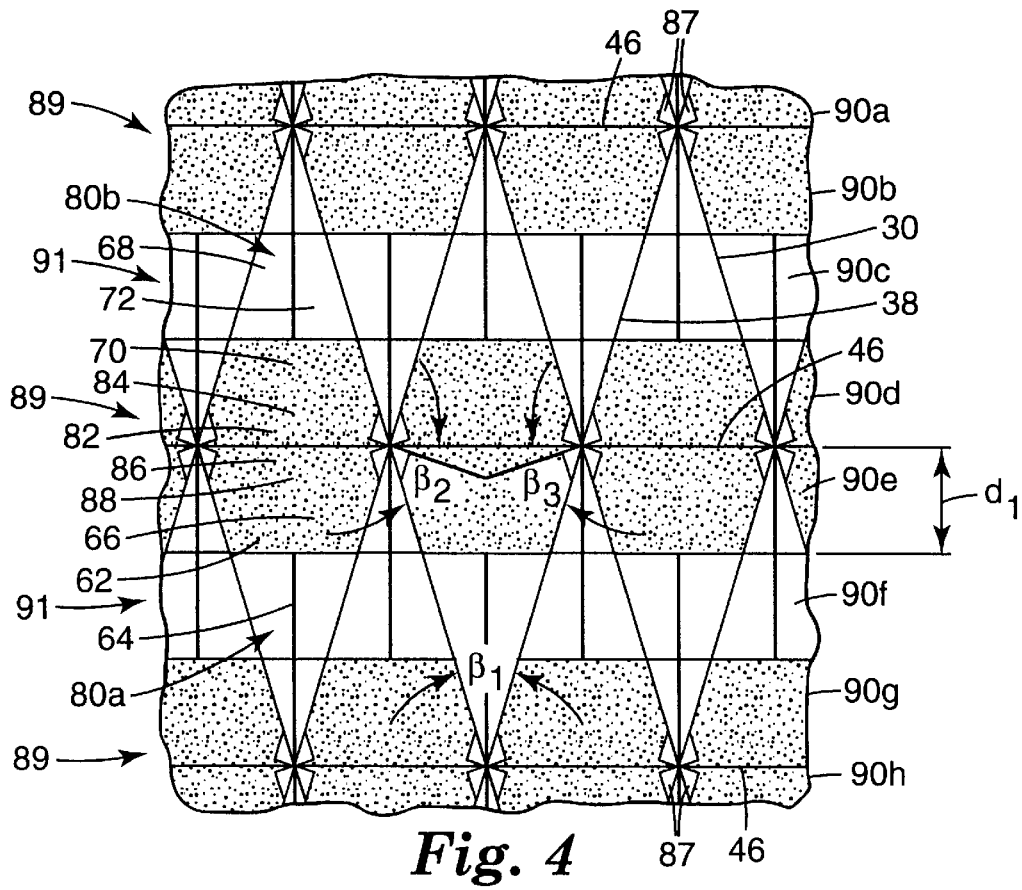
FIG. 4 is a plan view of a mold for forming retroreflective sheeting.
Figure 5:
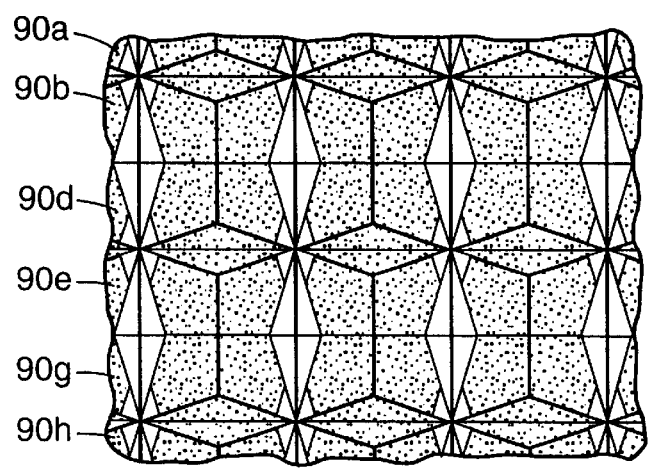
FIG. 5 is a plan view of the mold of FIG. 4 for forming retroreflective sheeting according to an embodiment of the invention.

FIGS. 4—5 illustrate a preferred method of forming highly canted truncated cube corner elements on a plurality of laminae 90, such as disclosed in a U.S. Patent Application entitled Retroreflective Cube Corner Sheeting, Molds Therefore, and Methods of Making the Same (Atty. Docket No. 53318USA8A). First, second and third groove sets 30, 38, 46, respectively, form a plurality of fully formed truncated cube corner elements 80a, 80b on the working surfaces of the plurality of laminae 90. The cube corner elements 80a, 80b preferably extend across at least a portion of several laminae. Altering the location and groove angles of the grooves 46 of the third groove set permits the manufacture of varying cube corner element geometries.

In the disclosed embodiment, cube corner elements 80a and 80b are substantially identical in shape and size, but are disposed at 180° orientations relative to one another. Cube corner elements 80a have three mutually perpendicular optical faces: two optical faces formed by faces 62 and 66, and a third optical face 86 corresponding to one surface of the third groove 46. The bottom edges of faces 62, 66 and 86 define base triangles having included angles $\beta_1$, $\beta_2$, and $\beta_3$. Optical faces 62, 66 and 86 mutually intersect at a cube corner element peak 88. Alternatively, the faces 62, 66, 86 do not necessarily need to intersect in a peak. Rather, a plateau or flat region can be formed that permits light to be transmitted through the retroreflective sheeting. Cube corner elements 80b have three mutually perpendicular optical faces: two optical faces formed by surfaces 68 and 72, and a third optical face 82 corresponding to the opposite side of the third groove 46. The bottom edges of faces 68, 72 and 82 define base triangles having included angles $\beta_1$, $\beta_2$, and $\beta_3$. Optical faces 68, 72 and 82 mutually intersect at a cube corner element peak 84.

In the embodiment described herein, base angle $\beta_1$ measures 33.06°, base angle $\beta_2$ measures 73.47° and base angle $\beta_3$ measures 73.47°. Cube corner elements with non-equilateral base triangles are commonly referred to in the cube corner arts as 'canted' cube corner elements. Canting cube corner elements either backward or forward enhances entrance angularity. Canting the cube corners in the backward direction elongates optical faces 62, 66 and reduces base angle $\beta_1$. Additionally, canting cube corner elements 80 in the backward direction improves the entrance angularity performance of the cube corner elements 80 in a plane substantially parallel with common edges 64 and 70, especially for canting greater than about 12°. As will be discussed below, the more optically active portions of the cube corner elements 80 are generally concentrated along selected laminae. This property has utility in retroreflective sheeting applications designed to retroreflect light incident on the sheeting at high entrance angles. Alternatively, the base angles $\beta_1$, $\beta_2$ and $\beta_3$ can all be different (scalene triangles), such as disclosed in WO 96/42024 (Smith et al.). Additionally, the best planes of entrance angularity are not necessarily in the direction of cant, such as disclosed in WO 96/42025 (Smith et al.).

The cube corner elements are shaded to illustrate the more optically active portions 89 of the cube corner elements at an entrance angle from about 0° to about 45°. The more optically active portions 89 of the cube corner elements (cube corner element segments) are concentrated adjacent to the third groove 46, while the less optically active portions 91 of the cube corner elements are displaced from third groove 46. The portion of a cube corner element on a single lamina that has three mutually perpendicular optical faces is referred to as a cube corner element segment. The portions of the cube corner elements removed typically do not have three mutually perpendicular optical faces, and consequently, are not cube corner element segments. The density of the more optically active cube corner element segments are concentrated to provide enhanced optical properties.

The more optically active portions 89 can include less optically active regions 87 located near the angles $\beta_2$, $\beta_3$. A relatively small portion of the cube corner elements 80a, 80b depicted in FIG. 4 are optically active. As the entrance angle decreases toward zero, the area of the more optically active portions 89 and the effective aperture of that region decreases. At some point, the effective aperture becomes a slit, diffracting light leaving the retroreflective article primarily in a plane containing the optical axis of the cube corner element and perpendicular to the slit. The diffraction within the slit aperture directs the reflected light primarily in one plane and degrades uniformity of the divergence profile of the retroreflected light, as discussed in ASTM E808-94.

FIG. 5 presents a top plan view of a plurality of optically opposing cube corner element segments formed by removing a plurality of laminae (90c and 90f) from the assembly depicted in FIG. 4. All of the laminae may or may not be the same thickness. In an alternate embodiment, the laminae 90c, 90f can be contiguous with one of the adjacent laminae, for example 90b and 90e, respectively. The portion of such contiguous laminae corresponding to 90c and 90f can then be removed by machining.

In one preferred embodiment, the plurality of cube corner element segments depicted in FIG. 5 results from removing from the assembly those laminae which have the less optically active portions of the cube corner element segments disposed on their respective working surfaces. The laminae removed from the assembly 90c, 90f are referred to herein as sacrificial laminae. The sacrificial laminae are removed from the assembly and the remaining laminae are reassembled in a suitable fixture to provide a structured surface comprising a plurality of cube corner element segments that correspond to the more optically active portions of the fully formed cube corner elements formed in the working surfaces of the plurality of laminae in the original assembly. Because the less optically active portions of the cube corner element segments are removed, a retroreflector formed as a replica of this mold can exhibit substantially higher retroreflective efficiency than the retroreflector formed as a replica of the surface of the original assembly across a wide range of entrance angles. The laminae 90c, 90f can optionally be removed from the assembly prior to forming the third groove set 46. Formation of retroreflective sheeting from the mold of FIG. 5 is discussed below.

The optically active portions 89 of FIGS. 4 and 5 illustrate a plurality of cube corner element matched pairs. It will be understood that the laminae 90 can be arranged in a variety of configurations. For example, the laminae 90b, 90e, 90h can be grouped together in a first sub-array and the laminae 90a, 90d, 90g grouped together in a second sub-array, physically separated from the first sub-array. The cube corner elements on the laminae 90b, 90e, 90h can be optically opposing to the cube corner elements 90a, 90d, 90g, without being physically adjacent. Retroreflective sheeting constructed as discussed above would preferably include four sub-arrays.

Figure 6:
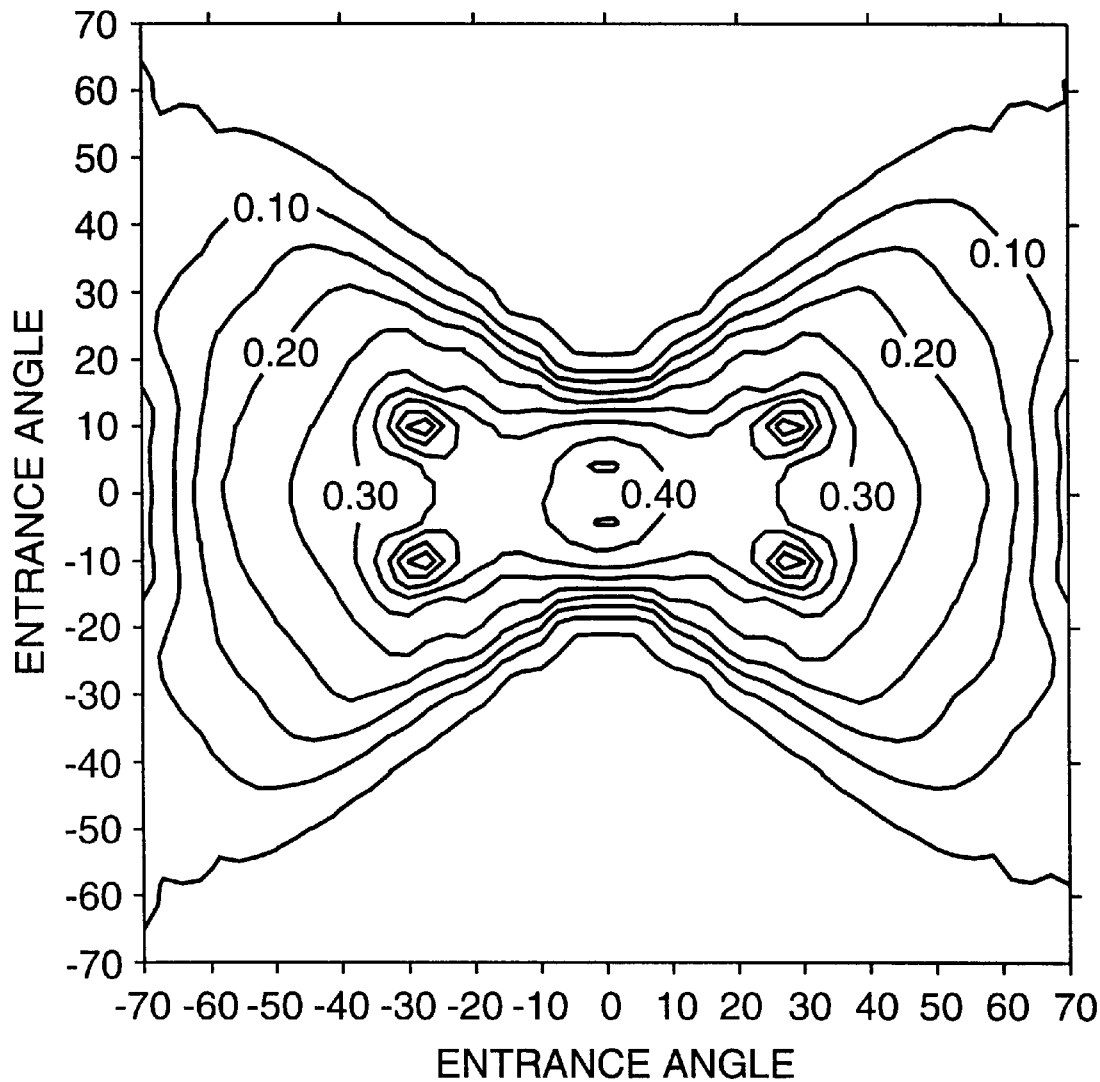
FIG. 6 is a polar plot of the isobrightness contours of retroreflected light for cube corner sheeting formed from the mold of FIG. 5.

FIG. 6 is an isobrightness contour depicting the total light return profile of retroreflective sheeting having a structured surface comprising cube corner elements according to FIGS. 4 and 5 canted at 18° in a backward direction formed from a material having an index of refraction of 1.59. Again, the preferred highly canted cube corner elements provide one primary plane of entrance angularity.

Figure 7:
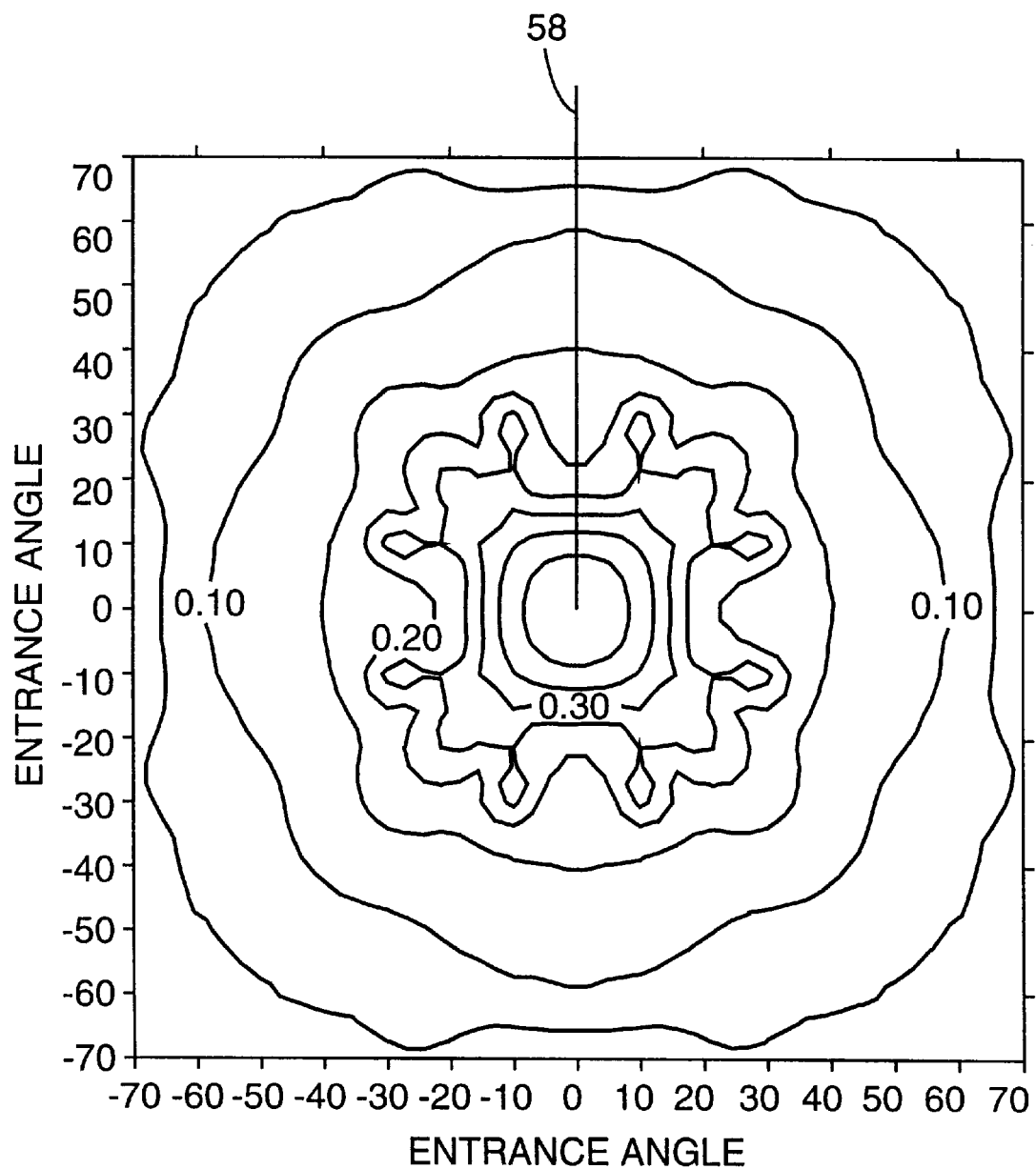
FIG. 7 is a polar plot of the isobrightness contours of retroreflected light for cube corner sheeting formed from the mold of FIG. 5 arranged in a plurality of generally orthogonal arrays.

FIG. 7 is an isobrightness contour depicting the total light return profile of retroreflective sheeting having a structured surface comprising cube corner element segments of FIG. 5 canted 18° in a backward direction, tiled in accordance with the embodiment depicted in FIG. 1, and formed from a material having an index of refraction of 1.59.

Table 2 below, arranged in the same format as Table 1, contains the data presented graphically in FIG. 7. The rotational orientation data of Table 2 is limited to 0 to 90°, rather than a full 360°, since the pattern repeats every 90°. The total light return data for Table 2 does not include losses due to sealing, reflective coatings, etc. Zero degree orientation in Table 2 corresponds to the positive y-axis 58.

at an angle $\delta_1$ as shown. At least two adjacent grooves 130 are formed in the laminae 100, with each groove having a first and second groove surface 132, 134 that intersect at a groove vertex 133. At the edge of the lamina, the groove forming operation can form a single groove surface 132. Importantly, the groove surfaces 132 and 134 of adjacent grooves intersect approximately orthogonally along a reference edge 136. Preferably this pattern is repeated across the entire working surfaces of the plurality of laminae 100.

The grooves 130 are formed by removing portions of the working surface of the plurality of laminae using any of a variety of suitable material removal techniques including precision machining techniques such as milling, ruling, grooving and fly-cutting. Further, chemical etching or laser ablation techniques can also be used. In one embodiment, the grooves 130 of the first groove set are formed in a high-precision machining operation in which a diamond cutting tool having a 90° included angle is repeatedly moved transversely across the working surfaces of the plurality of laminae 100 along an axis that is substantially parallel to

TABLE 2

| entrance angle | rotational orientation angle | | | | | | | | | | min | max | range |
|---|---|---|---|---|---|---|---|---|---|---|---|---|---|
| | 0 | 10 | 20 | 30 | 40 | 50 | 60 | 70 | 80 | 90 | | | |
| 0 | 0.422 | 0.420 | 0.420 | 0.416 | 0.415 | 0.415 | 0.416 | 0.417 | 0.418 | 0.418 | 0.415 | 0.420 | 0.005 |
| 10 | 0.401 | 0.388 | 0.393 | 0.393 | 0.394 | 0.394 | 0.393 | 0.392 | 0.388 | 0.394 | 0.388 | 0.394 | 0.007 |
| 20 | 0.217 | 0.214 | 0.228 | 0.298 | 0.272 | 0.272 | 0.298 | 0.229 | 0.214 | 0.216 | 0.214 | 0.298 | 0.084 |
| 30 | 0.173 | 0.171 | 0.314 | 0.172 | 0.252 | 0.252 | 0.171 | 0.314 | 0.171 | 0.173 | 0.171 | 0.314 | 0.143 |
| 40 | 0.153 | 0.149 | 0.146 | 0.146 | 0.178 | 0.176 | 0.144 | 0.145 | 0.149 | 0.153 | 0.144 | 0.178 | 0.034 |
| 50 | 0.125 | 0.120 | 0.117 | 0.116 | 0.130 | 0.130 | 0.112 | 0.114 | 0.120 | 0.125 | 0.112 | 0.130 | 0.018 |
| 60 | 0.098 | 0.094 | 0.090 | 0.082 | 0.094 | 0.094 | 0.082 | 0.087 | 0.093 | 0.098 | 0.082 | 0.098 | 0.016 |
| 70 | 0.015 | 0.019 | 0.061 | 0.055 | 0.063 | 0.063 | 0.055 | 0.060 | 0.019 | 0.015 | 0.015 | 0.063 | 0.048 |

Figure 9:
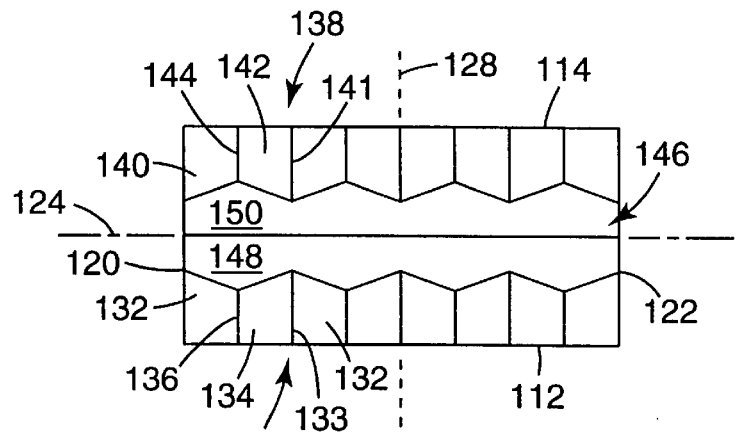
FIG. 9 is a top plan view of the cube corner element of FIG. 8.
Figure 8:
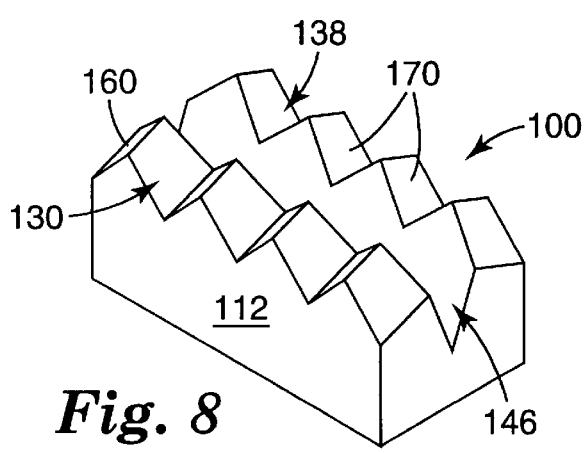
FIG. 8 is a perspective view of an alternate embodiment of a cube corner element.
Figure 10:
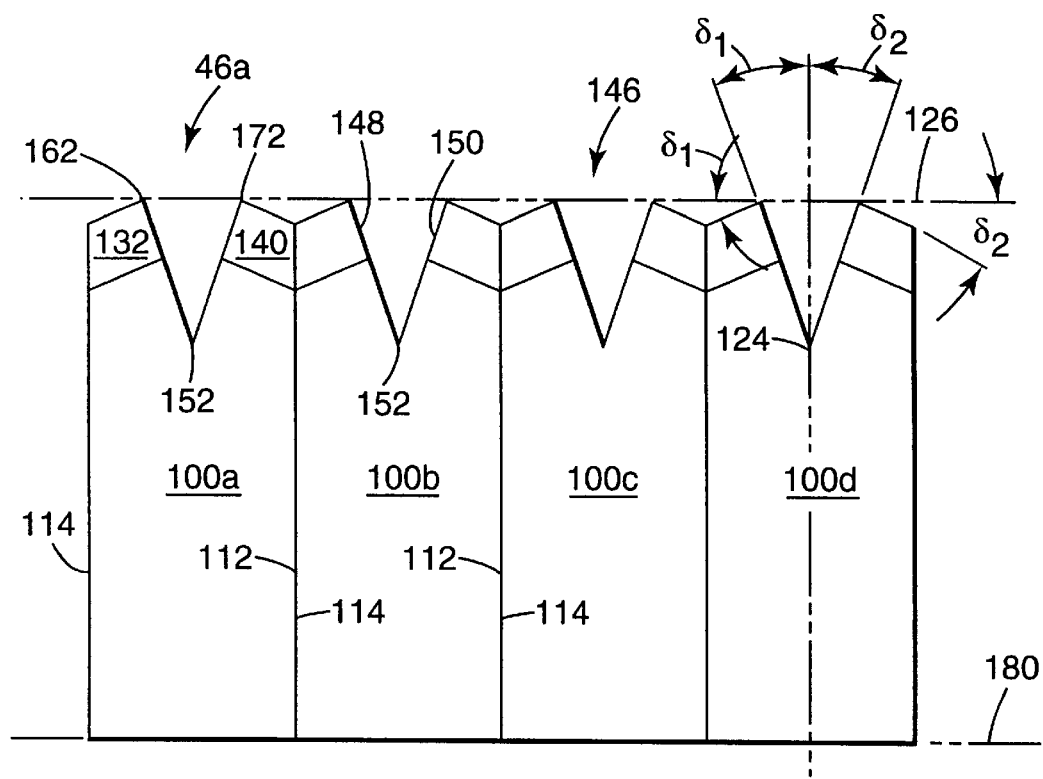
FIG. 10 is a side view of a mold for forming retroreflective sheeting utilizing the lamina of FIG. 8

FIGS. 8–10 illustrate a lamina 100 containing a plurality of highly canted full cube corner elements, such as disclosed in a U.S. Patent application entitled Cube Corner Sheeting Mold and Method of Making the Same (Atty. Docket No. 51946USA9A), suitable for use as a master mold to form full cube corner elements. Alternatively, the full cube corner elements disclosed in U.S. Patent Application entitled Retroreflective Cube Corner Sheeting Mold and Sheeting Formed Therefrom (Atty. Docket No. 53305USA5A) can be used. Full cube corner elements have a higher total light return than truncated cube corner elements for a given amount of cant, but the full cubes lose total light return more rapidly at higher entrance angles. One benefit of full cube corner elements is higher total light return at low entrance angles, without too large of a loss in performance at higher entrance angles.

For purposes of description, a Cartesian coordinate system can be superimposed onto lamina 100. A first reference plane 124 is centered between first major surface 112 and second major surface 114. First reference plane 124, referred to as the x-z plane, has the y-axis as its normal vector. A second reference plane 126, referred to as the x-y plane, extends substantially coplanar with the working surface of lamina 100 and has the z-axis as its normal vector. A third reference plane 128, referred to as the y-z plane, is centered between first end surface 120 and second end surface 122 and has the x-axis as its normal vector. It will be appreciated that geometric attributes of the preferred embodiments can be described using coordinate systems other than the Cartesian reference planes herein described, or with reference to the structure of the lamina.

The laminae 100 contain a first groove set comprising a plurality of parallel adjacent V-shaped grooves 130 disposed base surface 180. The cutting tool can be alternately be moved along an axis that is non-parallel to base surface 180 such that the tool cuts at a varying depth across the plurality of laminae 100. It will be appreciated that the machining tool can be held stationary while the plurality of laminae are placed in motion; any technique having relative motion between the plurality of laminae 100 and the machining tool is contemplated. Thus, in a top plan view, reference edges 136 appear perpendicular to the respective first reference planes 124 of the plurality of laminae 100.

A second groove set comprising a plurality of parallel adjacent V-shaped grooves 138 is formed in the working surfaces of the plurality of laminae 100 with the lamina disposed at an angle $\delta_2$. At least two adjacent grooves 138 are formed in the working surface of the plurality of laminae 100 with each groove 138 having a third and fourth groove surface 140, 142 that intersect at a groove vertex 141. At the edge of the lamina, the groove forming operation can form a single groove surface 140. Importantly, the groove surfaces 140 and 142 of adjacent grooves intersect approximately orthogonally along a reference edge 144. Preferably this pattern is repeated across the entire working surfaces of the plurality of laminae 100.

Grooves 138 are preferably formed at approximately the same depth in the working surface of the plurality of laminae 100 as grooves 130 in the first groove set. Additionally, the grooves 138 in the second groove set are preferably formed such that the groove vertices 141 and reference edges 144 are substantially coplanar with the respective groove vertices 133 and reference edges 136 of the grooves 130 in the first groove set.

A third groove set is formed that preferably includes at least one groove 146 in each lamina 100. The third grooves 146 define fifth and sixth groove surfaces 148, 150 that intersect at respective groove vertices 152 along axes that are parallel to the first reference planes 124. Importantly, the third grooves 146 are formed such that fifth groove surfaces 148 are substantially orthogonal to first groove surfaces 132 and second groove surfaces 134. Formation of the fifth groove surfaces 148 yields a plurality of cube corner elements 160.

Each cube corner element 160 is defined by a first groove surface 132, a second groove surface 134, and a portion of a fifth groove surface 148 that mutually intersect at a point to define a cube corner peak, or apex 162. Similarly, sixth groove surface 150 is substantially orthogonal to third groove surfaces 140 and second groove surfaces 142. Formation of the sixth groove surface 150 also yields a plurality of cube corner elements 170 in the working surface of lamina 100. Each cube corner element 170 is defined by a third groove surface 140, a fourth groove surface 142, and a portion of sixth groove surface 150 that mutually intersect at a point to define a cube corner peak, or apex 172. Preferably, both fifth groove surface 148 and sixth groove surface 150 form a plurality of cube corner elements on the working surface of lamina 100. However, third groove 146 can alternately be formed such that only fifth groove surface 148 or sixth groove surface 150 forms cube corner elements. Additionally, an apex 162, 172 is not required. For some applications, planar regions can be formed in the cube corner elements to permit the transmission of light through the sheeting.

Preferably, grooves 146 are also formed by a high precision machining operation. In the disclosed embodiment a diamond cutting tool having an included half-angle of about 46.55° (corresponding to about 12° of tilt) to about 10.52° (corresponding to about 30° of tilt), and more preferably about 42.52° (corresponding to about 14° of tilt) to about 30.52° (corresponding to about 20° of tilt) moves across the working surface of each lamina 100 along an axis that is substantially contained by the first reference plane 124 and that is parallel to base surface 180. In order to achieve highly canted cube corner elements, the grooves 146 are deeper than the vertices 133, 141 of the grooves in the first and second groove sets 130, 138, respectively.

The cube corner element geometry formed in working surface of lamina 100 can be characterized as a 'full' or 'high efficiency' cube corner element geometry because the geometry exhibits a maximum effective aperture that approaches 100%. Thus, a retroreflector formed as a replica of the working surface will exhibit high optical efficiency in response to light incident on the retroreflector approximately along the symmetry axes of the cube corner elements. Additionally, cube corner elements 160 and 170 are disposed in opposing orientations and are symmetrical with respect to first reference plane 124 and will exhibit symmetric retroreflective performance in response to light incident on the retroreflector at high entrance angles. It is not required, however, that the cube corner elements be symmetrical about the reference planes.

Preferred laminae 100 are formed from a dimensionally stable material capable of holding precision tolerances, such as a machinable plastic (for example, polyethylene teraphthalate, polymethyl methacrylate, and polycarbonate) or metal (for example, brass, nickel, copper, or aluminum). The physical dimensions of the laminae are constrained primarily by machining limitations. The laminae preferably measure at least 0.1 millimeters in thickness, between 5.0 and 100.0 millimeters in height, and between 10 and 500 millimeters in width. However, these measurements are provided for illustrative purposes only and are not intended to be limiting. A planar interface between major surfaces 112, 114 is maintained between adjacent laminae during the machining phase and in the subsequent mold formed therefrom so as to minimize alignment problems and damage due to handling of the laminae, to minimize gaps between adjacent laminae that would degrade the quality of negative copies, and to minimize flash from migrating into the gaps between the laminae.

In the manufacture of retroreflective articles such as retroreflective sheeting, the structured surface of the plurality of laminae is used as a master mold which can be replicated using electroforming techniques or other conventional replicating technology. The plurality of laminae can include substantially identical cube corner elements or can include cube corner elements of varying sizes, geometries, or orientations. The structured surface of the replica, referred to in the art as a 'stamper', contains a negative image of the cube corner elements. This replica can be used as a mold for forming a retroreflector. More commonly, however, a large number of positive or negative replicas are assembled to form a mold large enough to be useful in forming retroreflective sheeting. Such retroreflective sheeting can be manufactured as an integral material, e.g. by embossing a preformed sheet with an array of cube corner elements as described above or by casting a fluid material into a mold. See, JP 8-309851 and U.S. Pat. No. 4,601,861 (Pricone). Alternatively, the retroreflective sheeting can be manufactured as a layered product by casting the cube corner elements against a preformed film as taught in PCT application No. WO 95/11464 and U.S. Pat. No. 3,648,348 or by laminating a preformed film to preformed cube corner elements. By way of example, effective sheeting of the invention can be made using a nickel mold formed by electrolytic deposition of nickel onto a master mold. The electroformed mold can be used as a stamper to emboss the pattern of the mold onto a polycarbonate film approximately 500 $\mu$m thick having an index of refraction of about 1.59. The mold can be used in a press with the pressing performed at a temperature of approximately 175° to 200° C.

Useful materials for making reflective sheeting according to the invention are preferably materials that are dimensionally stable, durable, weatherable and readily formable into the desired configuration. Examples of suitable materials include acrylics, which generally have an index of refraction of about 1.5, such as Plexiglas resin from Rohm and Haas; thermoset acrylates and epoxy acrylates, preferably radiation cured, polycarbonates, which have an index of refraction of about 1.6; polyethylene-based ionomers (marketed under the name 'SURLYN'); polyesters; and cellulose acetate butyrates. Generally an optically transmissive material that is formable, typically under heat and pressure, can be used. Other suitable materials are disclosed in U.S. Pat. No. 5,450,235 to Smith et al. The sheeting can also include colorants, dyes, UV absorbers, or other additives as needed.

It is desirable in some circumstances to provide retroreflective sheeting with a backing layer. A backing layer is particularly useful for retroreflective sheeting that reflects light according to the principles of total internal reflection. A suitable backing layer can be made of any transparent or opaque material, including colored materials, that can be effectively engaged with the retroreflective sheeting. Suitable backing materials include aluminum sheeting, galvanized steel, polymeric materials such as polymethyl methacrylates, polyesters, polyamides, polyvinyl fluorides, polycarbonates, polyvinyl chlorides, polyurethanes, and a wide variety of laminates made from these and other materials.

The backing layer or sheet can be sealed in a grid pattern or any other configuration suitable to the reflecting elements. Sealing can be affected by a number of methods including ultrasonic welding, adhesives, or by heat sealing at discrete locations on the arrays of reflecting elements (see, e.g. U.S. Pat. No. 3,924,928). Sealing is desirable to inhibit the entry of contaminants such as soil and/or moisture and to preserve air spaces adjacent the reflecting surfaces of the cube corner elements.

If added strength or toughness is required in the composite, backing sheets of polycarbonate, polybutryate or fiber-reinforced plastic can be used. Depending upon the degree of flexibility of the resulting retroreflective material, the material can be rolled or cut into strips or other suitable designs. The retroreflective material can also be backed with an adhesive and a release sheet to render it useful for application to any substrate without the added step of applying an adhesive or using other fastening means.

The cube corner elements can be individually tailored so as to distribute light retroreflected by the articles into a desired pattern or divergence profile, as taught by U.S. Pat. No. 4,775,219. Typically the groove half-angle error introduced will be less than ±20 arc minutes and often less than ±5 arc minutes.

Figure 11:
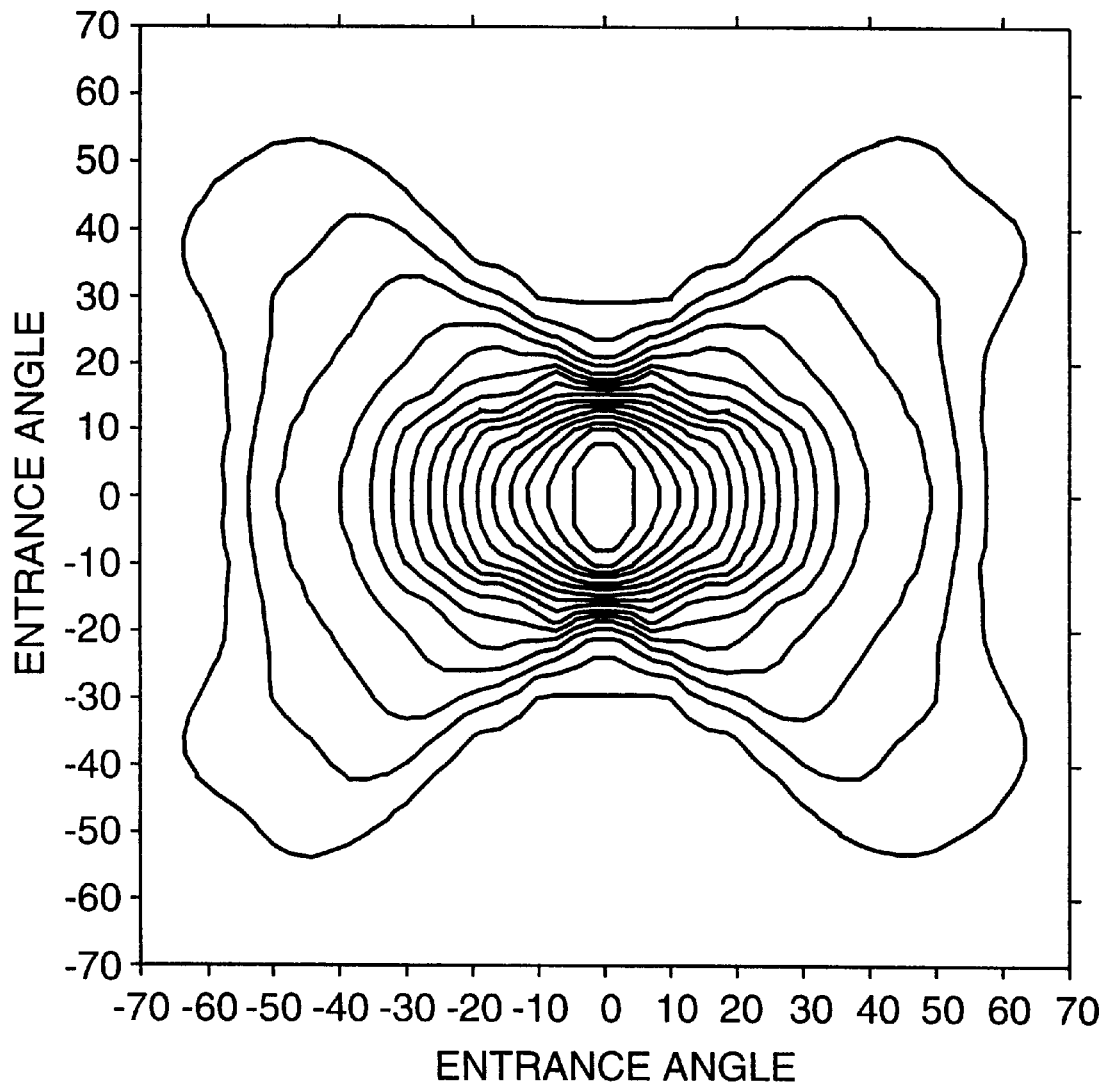
FIG. 11 is a polar plot of the isobrightness contours of retroreflected light for cube corner elements tilted at 140 formed from the mold of FIG. 10.

FIG. 11 is an isobrightness contour depicting the total light return profile of retroreflective sheeting having a structured surface comprising full cube corner elements according to FIGS. 8–10 canted 14° (groove 146 having an included angle of 42.52°) in a backward direction formed with the embodiment of FIG. 1, and formed from a material having an index of refraction of 1.59. Table 3 contains the total light return data presented graphically in FIG. 12. The rotational orientation data of Table 3 is limited to 0 to 90°, rather than a full 360°, since the pattern repeats every 90°. The total light return data for Table 3 does not include losses due to sealing, reflective coatings, etc. Zero degree orientation in Table 3 corresponds to the positive y-axis 58.

TABLE 3

| entrance angle | rotational orientation angle | | | | | | | | | | min | max | range |
|---|---|---|---|---|---|---|---|---|---|---|---|---|---|
| | 0 | 10 | 20 | 30 | 40 | 50 | 60 | 70 | 80 | 90 | | | |
| 0 | 0.899 | 0.899 | 0.899 | 0.899 | 0.899 | 0.899 | 0.899 | 0.899 | 0.899 | 0.899 | 0.899 | 0.899 | 0.000 |
| 10 | 0.754 | 0.745 | 0.731 | 0.724 | 0.717 | 0.719 | 0.723 | 0.733 | 0.744 | 0.754 | 0.717 | 0.754 | 0.036 |
| 20 | 0.350 | 0.363 | 0.442 | 0.437 | 0.376 | 0.376 | 0.437 | 0.442 | 0.364 | 0.350 | 0.350 | 0.442 | 0.092 |
| 30 | 0.189 | 0.191 | 0.196 | 0.224 | 0.244 | 0.244 | 0.225 | 0.196 | 0.191 | 0.189 | 0.189 | 0.244 | 0.055 |
| 40 | 0.110 | 0.107 | 0.105 | 0.113 | 0.178 | 0.180 | 0.113 | 0.105 | 0.108 | 0.110 | 0.105 | 0.180 | 0.075 |
| 50 | 0.083 | 0.081 | 0.078 | 0.078 | 0.129 | 0.129 | 0.079 | 0.078 | 0.080 | 0.083 | 0.078 | 0.129 | 0.051 |
| 60 | 0.013 | 0.015 | 0.031 | 0.055 | 0.087 | 0.087 | 0.055 | 0.031 | 0.015 | 0.013 | 0.013 | 0.087 | 0.074 |
| 70 | 0.006 | 0.006 | 0.009 | 0.035 | 0.056 | 0.051 | 0.035 | 0.009 | 0.006 | 0.006 | 0.006 | 0.056 | 0.050 |

Figure 13:
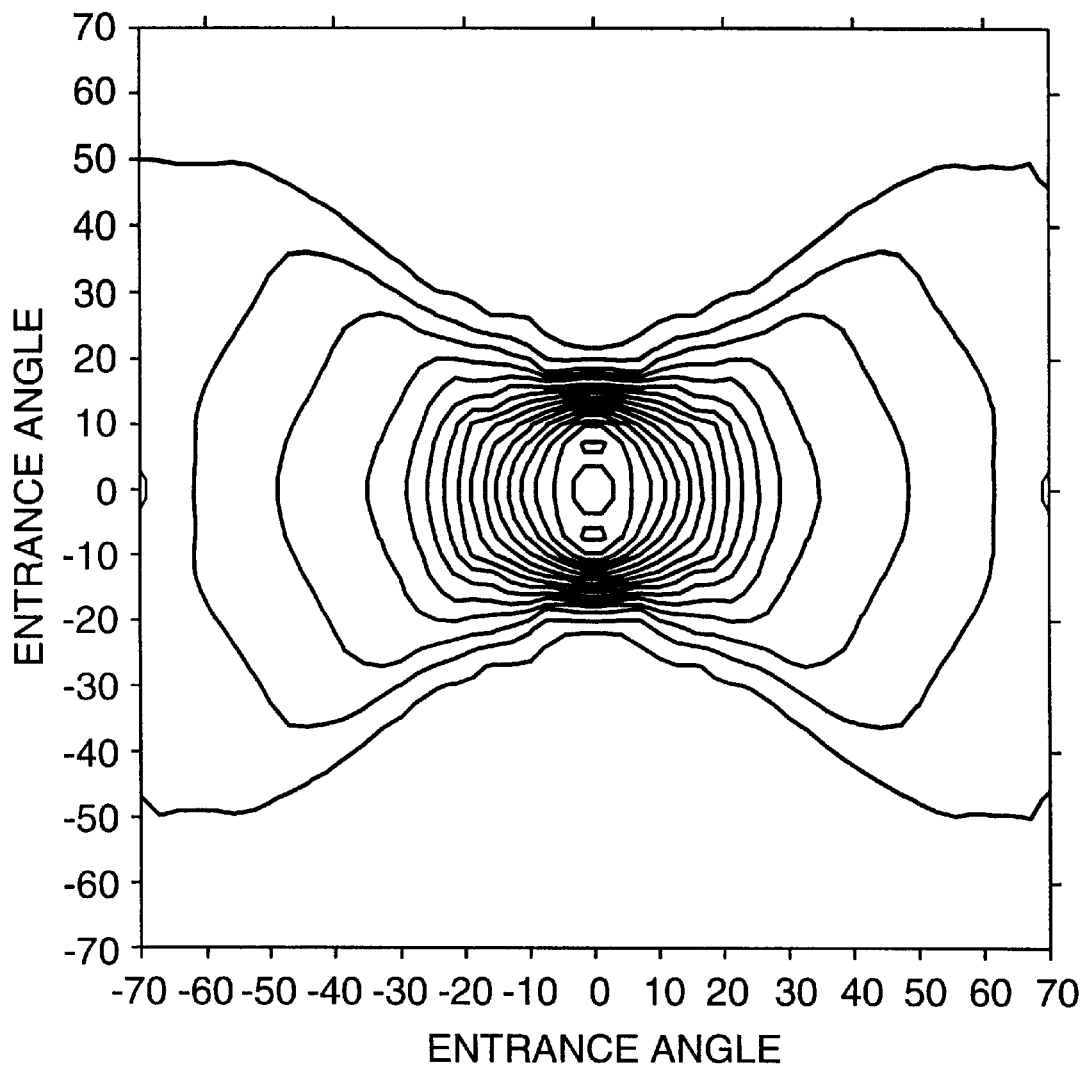
FIG. 13 is a polar plot of the isobrightness contours of retroreflected light for cube corner elements tilted at 20° formed from the mold of FIG. 10.
Figure 14:
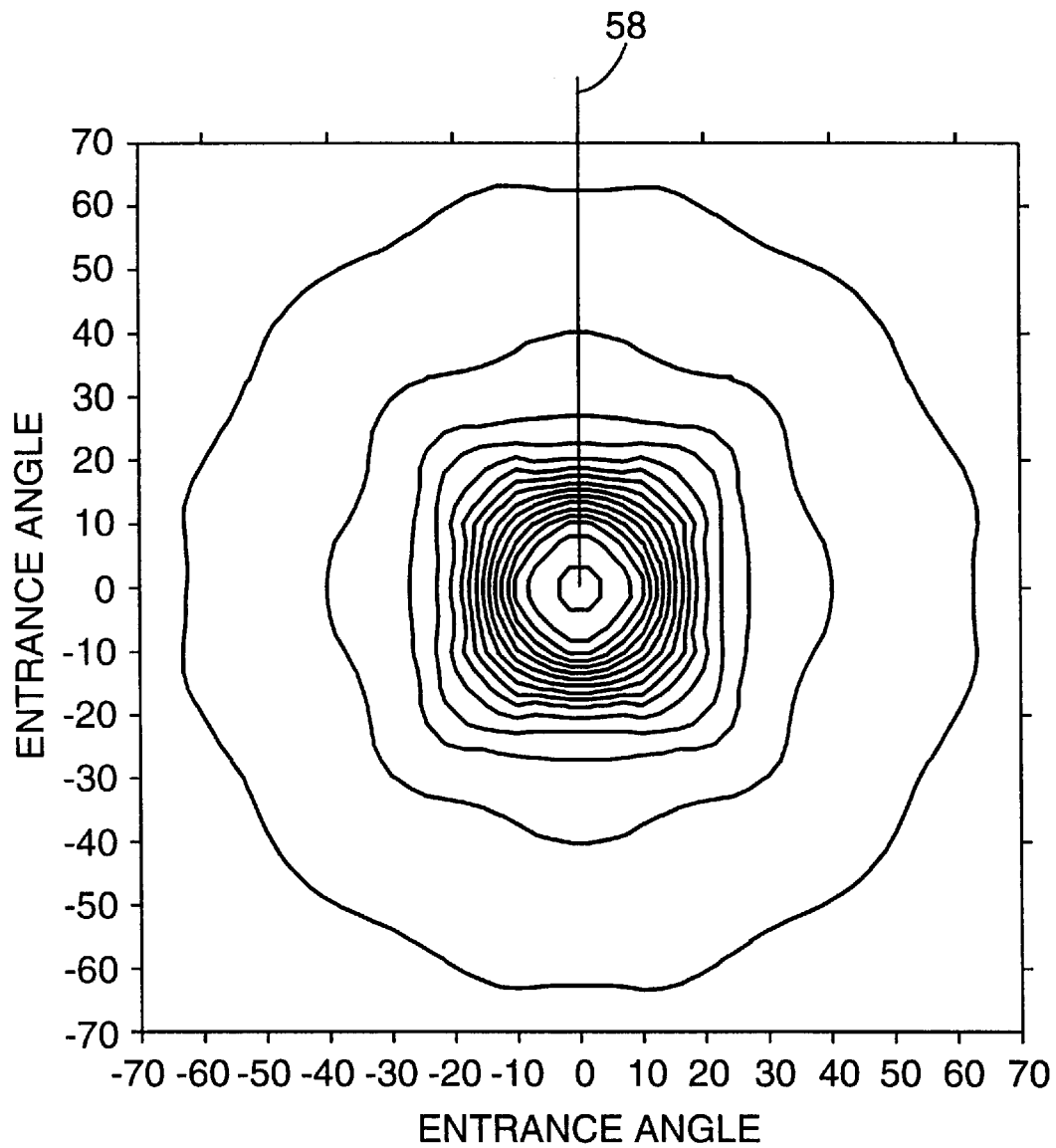
FIG. 14 is a polar plot of the isobrightness contours of retroreflected light for cube corner elements tilted at 20° formed from the mold of FIG. 10 and arranged in a plurality of generally orthogonal arrays.

FIG. 13 is an isobrightness contour depicting the total light return profile of retroreflective sheeting according to FIGS. 8–10 with full cube corner elements canted 20° (groove 146 having an included half-angle of 30.52°) in a backward direction and formed from a material having an index of refraction of 1.59. FIG. 14 is an isobrightness contour depicting the total light return profile of retroreflective sheeting having a structured surface comprising full cube corner elements of FIGS. 8–10 canted 20° in a backward direction, formed from a material having an index of refraction of 1.59, and tiled in accordance with the embodiment of FIG. 1. Table 4 below contains total light return data represented graphically in FIG. 14. The rotational orientation data of Table 4 is limited to 0 to 90° since the pattern repeats every 90°. The total light return data for Table 4 does not include losses due to sealing, reflective coatings, etc. Zero degree orientation in Table 4 corresponds to the positive y-axis 58.

TABLE 4

| entrance angle | rotational orientation angle | | | | | | | | | | min | max | range |
|---|---|---|---|---|---|---|---|---|---|---|---|---|---|
| | 0 | 10 | 20 | 30 | 40 | 50 | 60 | 70 | 80 | 90 | | | |
| 0 | 0.882 | 0.882 | 0.882 | 0.882 | 0.882 | 0.882 | 0.882 | 0.882 | 0.882 | 0.882 | 0.882 | 0.882 | 0.000 |
| 10 | 0.725 | 0.714 | 0.701 | 0.689 | 0.689 | 0.690 | 0.690 | 0.700 | 0.714 | 0.725 | 0.689 | 0.725 | 0.036 |
| 20 | 0.256 | 0.254 | 0.267 | 0.347 | 0.323 | 0.323 | 0.347 | 0.267 | 0.254 | 0.256 | 0.254 | 0.347 | 0.093 |
| 30 | 0.133 | 0.131 | 0.129 | 0.133 | 0.176 | 0.176 | 0.133 | 0.129 | 0.131 | 0.133 | 0.129 | 0.176 | 0.047 |
| 40 | 0.101 | 0.100 | 0.097 | 0.096 | 0.107 | 0.106 | 0.097 | 0.097 | 0.100 | 0.101 | 0.096 | 0.107 | 0.010 |
| 50 | 0.078 | 0.077 | 0.073 | 0.072 | 0.078 | 0.078 | 0.072 | 0.073 | 0.077 | 0.078 | 0.072 | 0.078 | 0.007 |
| 60 | 0.060 | 0.058 | 0.055 | 0.053 | 0.057 | 0.057 | 0.053 | 0.055 | 0.059 | 0.060 | 0.053 | 0.060 | 0.007 |
| 70 | 0.021 | 0.042 | 0.038 | 0.037 | 0.041 | 0.040 | 0.037 | 0.039 | 0.042 | 0.021 | 0.021 | 0.042 | 0.021 | from a material having an index of refraction of 1.59. The highly canted, full cube corner elements of FIGS. 8–10 provide one primary plane of entrance angularity.

Figure 12:
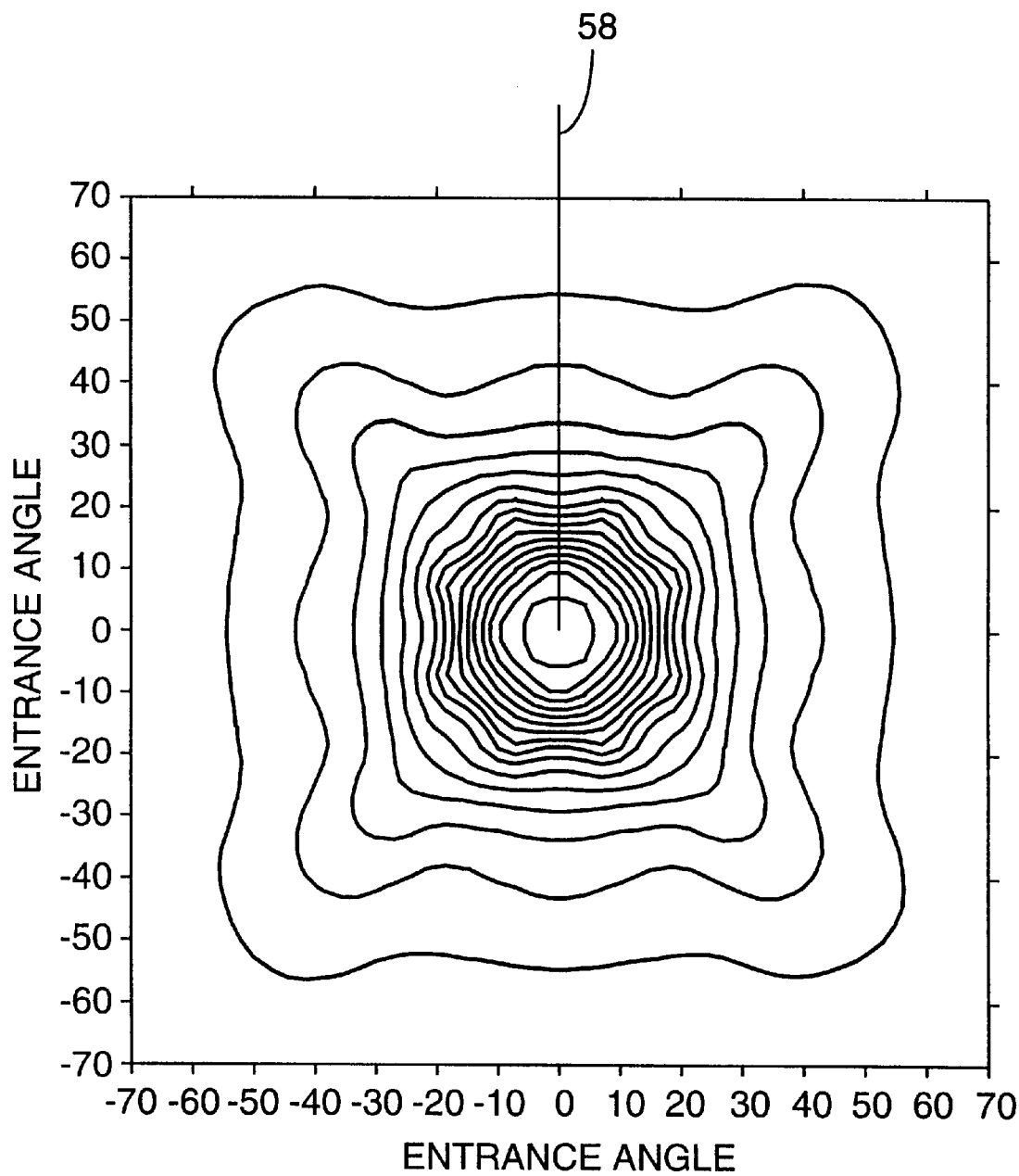
FIG. 12 is a polar plot of the isobrightness contours of retroreflected light for cube corner elements tilted at 14° formed from the mold of FIG. 10 and arranged in a plurality of generally orthogonal arrays.

FIG. 12 is an isobrightness contour depicting the total light return profile of retroreflective sheeting having a structured surface comprising full cube corner elements of FIGS. 8–10 canted 14° in a backward direction, tiled in accordance An aspect of the present invention relates to a mold assembly suitable for use in forming the present retroreflective sheeting and a method of making a retroreflective article using the mold. The mold assembly includes a substrate having a base surface and a mold surface opposite the base surface. The mold surface includes in roughly equal proportions a first and a second array of cube corner element opposing pairs. The symmetry axes of the cube corner elements in the array are preferably tilted in a backward direction at an angle measuring between 15.1° and 30° from an axis normal to the base surface. The second array of cube corner elements is oriented approximately perpendicular to the first array.

In an alternate embodiment, the first and second arrays of cube corner element opposing pairs are tilted by an angle between about 15.1° and about 20°. The method of making a retroreflective article includes forming a replica of the mold. The replica of the mold includes a mold surface having a negative image of the mold. A retroreflective article is formed in the mold surface of the replica.

All patents and patent applications referred to, including those disclosed in the background of the invention, are hereby incorporated by reference. The present invention has now been described with reference to several embodiments thereof. It will be apparent to those skilled in the art that many changes can be made in the embodiments described without departing from the scope of the invention. Thus, the scope of the present invention should not be limited to the preferred structures and methods described herein, but rather by the broad scope of the claims which follow.

What is claimed is:

1. A retroreflective article comprising a substrate having a base surface and a structured surface opposite the base surface, the structured surface comprising a plurality of arrays of cube corner elements, including:
   a first array of cube corner element opposing pairs, the symmetry axes of the cube corner elements in the array being tilted in a backward direction at an angle measuring between about 12° and about 30° from an axis normal to the base surface; and
   a second array of cube corner element opposing pairs, the symmetry axes of the cube corner elements in the array being tilted in a backward direction by an angle measuring between about 12° and about 30° from an axis normal to the base surface, the second array of cube corner elements being oriented approximately perpendicular to the first array so that the retroreflective article provides a minimum total light return of about 5% across about a 360° range of orientation angles at an entrance angle of about 40°.

2. The retroreflective article of claim 1 wherein the first array and the second array occupy roughly equal areas of the structured surface of the retroreflective article.

3. The retroreflective article of claim 1 wherein the cube corner elements are generally trihedral structures comprising three mutually perpendicular triangular optical faces that intersect at a peak and a triangular base, the base being approximately coplanar with the base surface of the article.

4. The retroreflective article of claim 1 wherein the cube corner elements are generally polygonal structures comprising three mutually perpendicular optical faces including two tetragonal optical faces and a third optical face that intersect at a peak, and a tetragonal base.

5. The retroreflective article of claim 1 wherein the symmetry axes of the cube corner elements in the first are tilted in a backward direction at an angle measuring between about 14°0 and about 20° from an axis normal to the base surface.

6. The retroreflective article of claim 1 wherein the symmetry axes of the cube corner elements in the first array are tilted in a backward direction at an angle measuring about 14° from an axis normal to the base surface.

7. The retroreflective article of claim 1 wherein the symmetry axes of the cube corner elements in the second array are tilted in a backward direction at an angle measuring between about 14° and about 20° from an axis normal to the base surface.

8. The retroreflective article of claim 1 wherein the symmetry axes of the cube corner elements in the second array are tilted in a backward direction at an angle measuring about 14° from an axis normal to the base surface.

9. The retroreflective article of claim 1 wherein the second array is oriented at an angle between about 85° and about 95° relative to the first array.

10. The retroreflective article of claim 1 wherein the cube corner element opposing pairs comprise physically adjacent cube corner elements.

11. The retroreflective article of claim 1 wherein the cube corner element opposing pairs each comprise a different retroreflection pattern.

12. The retroreflective article of claim 1 wherein the cube corner element opposing pairs comprise matched pairs.

13. The retroreflective article of claim 1 wherein the article provides a generally uniform total light return about a 360° range of orientation angles for entrance angles of greater than about 40°.

14. The retroreflective article of claim 1 wherein the article is capable of a minimum total light return of about 5% across about a 360° range of orientation angles at an entrance angle of about 50°.

15. The retroreflective article of claim 1 wherein the article is capable of a minimum total light return of about 5% across about a 360° range of orientation angles at an entrance angle of about 60°.

16. The retroreflective article of claim 1 wherein the article is capable of a minimum total light return of about 10% across about a 360° range of orientation angles at an entrance angle of about 40°.

17. The retroreflective article of claim 1 wherein the article is capable of a minimum total light return of about 10% across about a 360° range of orientation angles at an entrance angle of about 50°.

18. The retroreflective article of claim 1 wherein the article is capable of a minimum total light return of about 10% across about a 360° range of orientation angles at an entrance angle of about 60°.

19. The retroreflective article of claim 1 wherein the substrate and the cube corner elements are formed as a unitary article from a light transmissible material having a refractive index of between 1.3 and 1.7.

20. The retroreflective article of claim 1, wherein the substrate comprises a body layer comprising a light transmissible material having an elastic modulus less than about $7 \times 10^8$ pascals, and the cube corner elements comprise a light transmissible material having an elastic modulus greater than about $16 \times 10^8$ pascals.

21. The retroreflective article of claim 1 wherein a plurality of the cube corner elements incorporate minor deviations from perfect orthogonality to thereby alter the light distribution in the emerging cone of retroreflected light.

22. The retroreflective article of claim 1 wherein portions of the first and second arrays of cube corner elements are coated with a specularly reflective substance.

23. The retroreflective article of claim 1 further comprising a sealing medium disposed adjacent the first and second arrays of cube corner elements.

24. The retroreflective article of claim 1 wherein a sealing medium is bonded to the structured surface by a network of intersecting bonds to define a plurality of cells within which the cube corner elements are hermetically sealed.

25. The retroreflective article of claim 1 wherein a sealing medium maintains an air interface with the structured surface such that the cube corner elements retroreflect according to the principles of total internal reflection.

26. The retroreflective article of claim 1 wherein the cube corner elements comprise full cube corner elements.

27. A retroreflective article comprising a substrate having a base surface and a structured surface opposite the base surface, the structured surface comprising a plurality of arrays of cube corner elements, including:
   a first array of cube corner element opposing pairs, the symmetry axes of the cube corner elements in the array being tilted in a backward direction at an angle measuring between about 12° and about 30° from an axis normal to the base surface; and
   a second array of cube corner element opposing pairs, the symmetry axes of the cube corner elements in the array being tilted in a backward direction by an angle measuring between about 12° and about 30° from an axis normal to the base surface, the second array of cube corner elements being oriented approximately perpendicular to the first array so that the retroreflective article provides a generally uniform total light return about a 360° range of orientation angles.

28. A retroreflective article comprising a substrate having a base surface and a structured surface opposite the base surface, the structured surface comprising a plurality of arrays of cube corner elements, including:
   a first array of cube corner element opposing pairs, the symmetry axes of the cube corner elements in the array being tilted in a backward direction at an angle measuring between about 15.1° and about 30° from an axis normal to the base surface; and
   a second array of cube corner element opposing pairs, the symmetry axes of the cube corner elements in the array being tilted in a backward direction by an angle measuring between about 15.1° and about 30° from an axis normal to the base surface, the second array of cube corner elements being oriented approximately perpendicular to the first array.

29. A mold assembly suitable for use in forming retroreflective sheeting, the mold assembly comprising a substrate having a base surface and a mold surface opposite the base surface, the mold surface comprising in roughly equal proportions:
   a first array of cube corner element opposing pairs, the symmetry axes of the cube corner elements in the array being tilted in a backward direction at an angle measuring between about 15.1° and about 30° from an axis normal to the base surface; and
   a second array of cube corner element opposing pairs, the symmetry axes of the cube corner elements in the array being tilted in a backward direction by an angle measuring between about 15.1° and about 30° from an axis normal to the base surface, the second array of cube corner elements being oriented approximately perpendicular to the first array.

30. The method of claim 29 wherein the first and second arrays of cube corner element opposing pairs are tilted by an angle measuring between about 15.1° and about 20°.

31. A method of making a retroreflective article, comprising:
   providing a mold assembly suitable for forming retroreflective articles, the mold assembly comprising a substrate having a base surface and a mold surface opposite the base surface, the mold surface comprising in roughly equal proportions:
      a first array of cube corner element opposing pairs, the symmetry axes of the cube corner elements in the first array being tilted in a backward direction at an angle measuring between about 15.1° and about 30° from an axis normal to the base surface, and
      a second array of cube corner element opposing pairs, the symmetry axes of the cube corner elements in the second array being tilted in a backward direction by an angle measuring between about 15.1° and about 30° from an axis normal to the base surface wherein the second array of cube corner elements is oriented approximately perpendicular to the first array;
   forming a replica of the mold, the replica of the mold including a surface having a negative image of the mold; and
   forming a retroreflective article in the surface of the replica.

32. The method of claim 31 wherein the first and second arrays of cube corner element opposing pairs are tilted by an angle measuring between about 15.1° and about 20°.

* * * * *

UNITED STATES PATENT AND TRADEMARK OFFICE
CERTIFICATE OF CORRECTION

PATENT NO.    : 5,898,523
DATED         : April 27, 1999
INVENTOR(S)   : Smith et al.

It is certified that error appears in the above-identified patent and that said Letters Patent is hereby corrected as shown below:

<u>Title page,</u>
Item [56], under References Cited, U.S. PATENT DOCUMENTS, please insert
-- 2,310,790   02/09/43   Jungerson
   4,332,437   08/12/98   Searight et al. --

<u>Column 4,</u>
Line 10, "08/5887,719" should read -- 08/587,719 --

<u>Column 8,</u>
Line 41, "Appledom" should read -- Appeldorn --

<u>Column 14,</u>
Line 36, after "can" delete -- be --

<u>Column 19,</u>
Line 60, "14º0" should read -- 14º --

Signed and Sealed this

Sixth Day of August, 2002

Attest:

JAMES E. ROGAN
Attesting Officer    Director of the United States Patent and Trademark Office